(12) United States Patent
Nill

(10) Patent No.: US 12,104,344 B2
(45) Date of Patent: *Oct. 1, 2024

(54) ANCHOR AND RAILING ASSEMBLY

(71) Applicant: LN1, INC., Southampton, NY (US)

(72) Inventor: Lance Nill, Southampton, NY (US)

(73) Assignee: LN1, INC., Southampton, NY (US)

(*) Notice: Subject to any disclaimer, the term of this patent is extended or adjusted under 35 U.S.C. 154(b) by 83 days.

This patent is subject to a terminal disclaimer.

(21) Appl. No.: 17/429,757

(22) PCT Filed: Feb. 14, 2020

(86) PCT No.: PCT/US2020/018327
§ 371 (c)(1),
(2) Date: Aug. 10, 2021

(87) PCT Pub. No.: WO2020/168219
PCT Pub. Date: Aug. 20, 2020

(65) Prior Publication Data
US 2022/0127811 A1    Apr. 28, 2022

Related U.S. Application Data

(60) Provisional application No. 62/805,684, filed on Feb. 14, 2019.

(30) Foreign Application Priority Data

Feb. 14, 2019 (WO) ............... PCT/US2019/018592
Apr. 5, 2019 (WO) ............... PCT/US2019/026058
(Continued)

(51) Int. Cl.
*E04B 1/41* (2006.01)
*E02D 27/42* (2006.01)
(Continued)

(52) U.S. Cl.
CPC ............ *E02D 27/42* (2013.01); *E04B 1/4121* (2013.01); *E04B 1/4157* (2013.01);
(Continued)

(58) Field of Classification Search
CPC ..... E04F 11/18; E04F 11/181; E04F 11/1812; E04F 11/1814; E04F 11/1817;
(Continued)

(56) References Cited

U.S. PATENT DOCUMENTS 306,874 A * 10/1884 Thatcher
2,377,397 A    6/1945 Booth
(Continued)

FOREIGN PATENT DOCUMENTS

CN    2701956 Y    5/2005
CN    107709677 A    2/2018
(Continued)

OTHER PUBLICATIONS

International Search Report and Written Opinion for PCT/US18/65465 filed Dec. 13, 2018.
(Continued)

*Primary Examiner* — Jessica L Laux
(74) *Attorney, Agent, or Firm* — GALGAND IP LAW PLLC; Thomas M. Galgano

(57) ABSTRACT

An anchor and railing assembly for anchoring a baluster or balustrade to both outdoor and indoor structures, such as raised, generally flat or angled roof-like structures or indoor stairs or floors, which includes an anchor baseplate with a top surface and a bottom surface, and an internally threaded bore extending at least partially from the top surface generally towards the bottom surface, a baluster, fasteners for fastening the baluster to the anchor baseplate via its bore, and fasteners for fastening the anchor baseplate to either an outdoor or indoor structure.

26 Claims, 29 Drawing Sheets

(30) Foreign Application Priority Data

| | | | |
|---|---|---|---|
| Jul. 24, 2019 | (WO) | ............... | PCT/US2019/043264 |
| Aug. 12, 2019 | (WO) | ............... | PCT/US2019/046201 |
| Sep. 4, 2019 | (WO) | ............... | PCT/US2019/049549 |

(51) Int. Cl.

| | |
|---|---|
| *E04D 13/14* | (2006.01) |
| *E04F 11/18* | (2006.01) |
| *F16B 5/02* | (2006.01) |
| *F16B 9/00* | (2006.01) |
| *E04B 1/26* | (2006.01) |

(52) U.S. Cl.
CPC ...... *E04D 13/1407* (2013.01); *E04F 11/1812* (2013.01); *E04F 11/1853* (2013.01); *F16B 5/02* (2013.01); *F16B 9/054* (2018.08); *E04B 2001/2684* (2013.01)

(58) Field of Classification Search
CPC ........... E04F 11/1846; E04F 2011/1887; E04F 2011/1889; E04B 1/41; E04B 1/4121; E04B 1/4157; F16B 9/054; F16B 9/09; E04H 12/22; E04H 12/2253; E04H 12/2261; E04H 12/2269
See application file for complete search history.

(56) References Cited

U.S. PATENT DOCUMENTS

| | | | |
|---|---|---|---|
| 2,595,506 A | 5/1952 | Backman | |
| 3,245,181 A | 4/1966 | Stephenson | |
| 3,323,765 A * | 6/1967 | Fernandez | ............... F21V 21/10 52/295 |
| 3,456,412 A | 7/1969 | Decombas | |
| 3,715,850 A | 2/1973 | Chambers | |
| 3,749,424 A | 7/1973 | Greene | |
| 3,868,732 A | 3/1975 | Engelhart | |
| 4,371,139 A | 2/1983 | Clark | |
| 4,490,083 A | 12/1984 | Rebish | |
| 4,658,946 A | 4/1987 | Adrian et al. | |
| 4,750,306 A | 6/1988 | Granieri | |
| 5,085,547 A | 2/1992 | Vanotti | |
| 5,309,688 A | 5/1994 | Robertson | |
| 5,596,845 A | 1/1997 | Strizki | |
| 5,603,187 A * | 2/1997 | Merrin | ............... F24S 25/61 52/90.2 |
| 6,015,138 A * | 1/2000 | Kohlberger | ......... E04H 12/2261 256/70 |
| 6,141,928 A * | 11/2000 | Platt | ............... E04F 11/1814 52/832 |
| 6,290,212 B1 * | 9/2001 | Bartel | ............... E04F 11/181 256/65.14 |
| 6,295,773 B1 | 10/2001 | Alty | |
| 6,361,258 B1 | 3/2002 | Heesch | |
| 6,439,817 B1 | 8/2002 | Reed | |
| 6,557,912 B1 | 5/2003 | Truong | |
| 6,568,145 B2 | 5/2003 | Bartel | |
| 7,475,479 B1 | 1/2009 | Ross | |
| 7,624,479 B1 * | 12/2009 | Lin | ............... F16B 9/058 24/135 N |
| 8,448,405 B2 | 5/2013 | Schaefer et al. | |
| 8,752,338 B2 | 6/2014 | Schaefer et al. | |
| 8,833,033 B2 | 9/2014 | Schaefer et al. | |
| 9,097,017 B1 * | 8/2015 | Vanlennep | ............... E04C 3/34 |
| 9,347,232 B1 | 5/2016 | Francies, III | |
| 9,464,397 B1 | 10/2016 | Abraham | |
| 2001/0009087 A1 | 7/2001 | Valentz et al. | |
| 2003/0221385 A1 | 12/2003 | Platt | |
| 2005/0053449 A1 | 3/2005 | Grubert et al. | |
| 2005/0252124 A1 | 11/2005 | Bergman | |
| 2008/0240883 A1 | 10/2008 | Walling | |
| 2008/0263969 A1 * | 10/2008 | Poulis | ............... E04B 1/665 52/83 |
| 2009/0293417 A1 | 12/2009 | Ren et al. | |
| 2010/0247270 A1 | 9/2010 | Cao | |
| 2011/0158766 A1 | 6/2011 | Mitrovic | |
| 2012/0090263 A1 | 4/2012 | Schaefer et al. | |
| 2012/0222380 A1 | 9/2012 | Wentworth et al. | |
| 2013/0000243 A1 | 1/2013 | Steffen et al. | |
| 2013/0074441 A1 * | 3/2013 | Stearns | ............... E04D 13/10 52/705 |
| 2013/0145704 A1 | 6/2013 | Stein, Jr. | |
| 2013/0272816 A1 | 10/2013 | Vilas | |
| 2013/0291479 A1 | 11/2013 | Schaefer et al. | |
| 2014/0101913 A1 | 4/2014 | Roddenberry | |
| 2014/0138596 A1 * | 5/2014 | Ross | ............... F16G 11/04 256/47 |
| 2014/0219743 A1 | 8/2014 | Mitrovic | |
| 2015/0121797 A1 | 5/2015 | Brown et al. | |
| 2016/0017594 A1 | 1/2016 | Drummond et al. | |
| 2016/0298337 A1 | 10/2016 | Header | |
| 2017/0175384 A1 | 6/2017 | Bergman | |
| 2018/0073241 A1 | 3/2018 | Lomax et al. | |
| 2019/0352926 A1 * | 11/2019 | Kennedy | ............... E04H 17/12 |

FOREIGN PATENT DOCUMENTS

| | | |
|---|---|---|
| CN | 207960150 U | 10/2018 |
| DE | 4041765 A1 | 6/1992 |
| DE | 102008012717 A1 | 9/2009 |
| DE | 102011116877 A1 | 4/2013 |
| EP | 0926362 A1 | 6/1999 |
| EP | 3034893 A1 | 6/2016 |
| GB | 2682869 A | 11/2018 |
| JP | 2007 177559 | 7/2007 |
| JP | 56 48824 | 1/2015 |
| JP | 2021 545823 | 1/2024 |

OTHER PUBLICATIONS

International Search Report and Written Opinion for PCT/US19/18592 filed Feb. 19, 2019.

International Search Report and Written Opinion for PCT/US19/43264 filed Jul. 24, 2019.

International Search Report and Written Opinion for PCT/US19/046201 filed Aug. 12, 2019.

International Search Report and Written Opinion for PCT/US19/49549 filed Sep. 4, 2019.

International Search Report and Written Opinion for PCT/US20/18327 filed Feb. 14, 2020.

Communication dated Oct. 10, 2022 re: Chinese Notification of First Office Action on Examination with Search Report for CN 2020800132288.8.

Communication dated Oct. 5, 2022 re: Supplementary European Search Report for EP 20755309.

\* cited by examiner

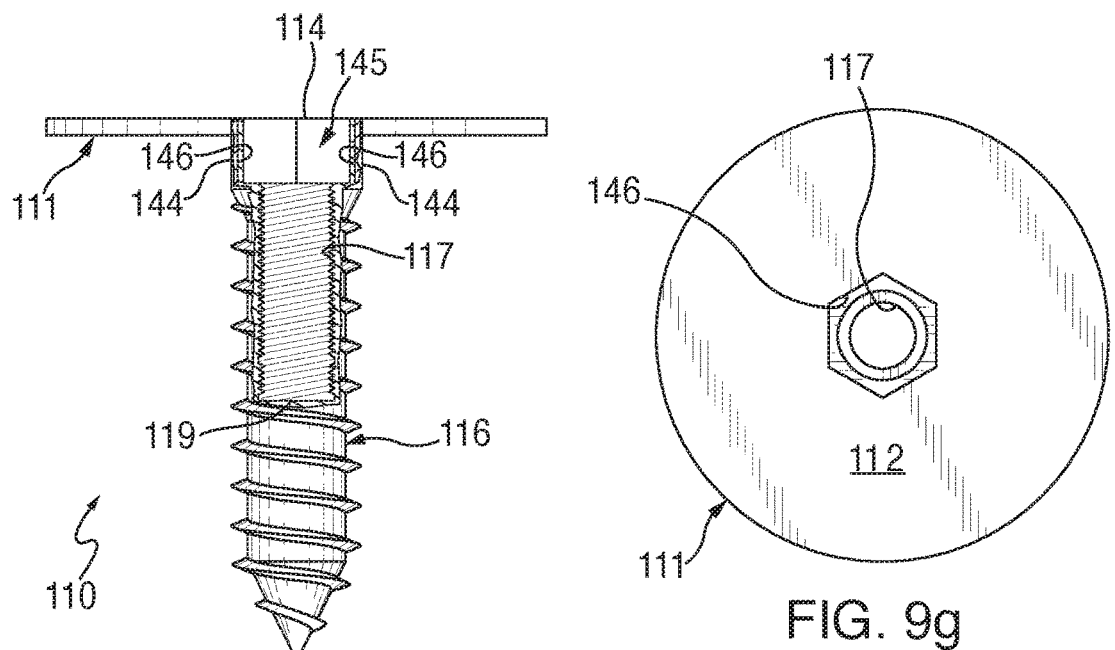
FIG. 9f
FIG. 9g
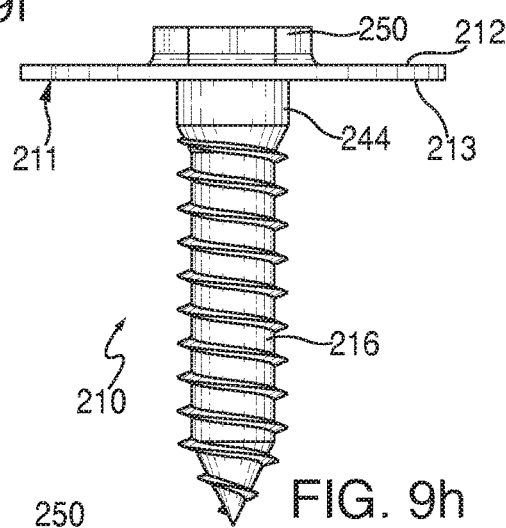
FIG. 9h
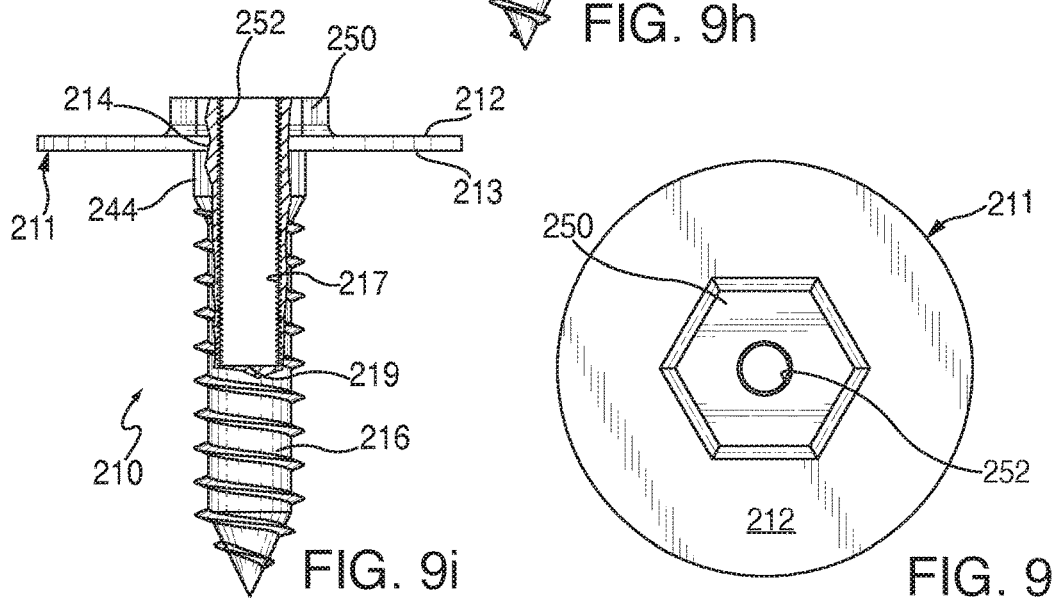
FIG. 9i
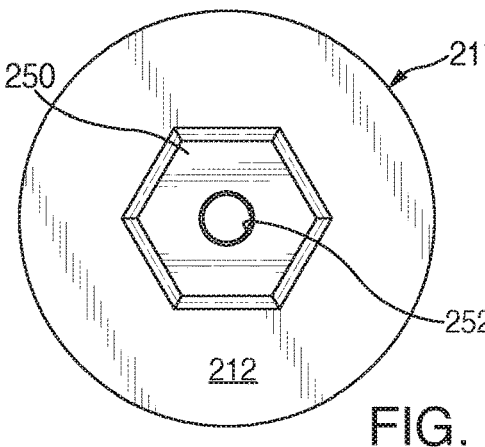
FIG. 9j

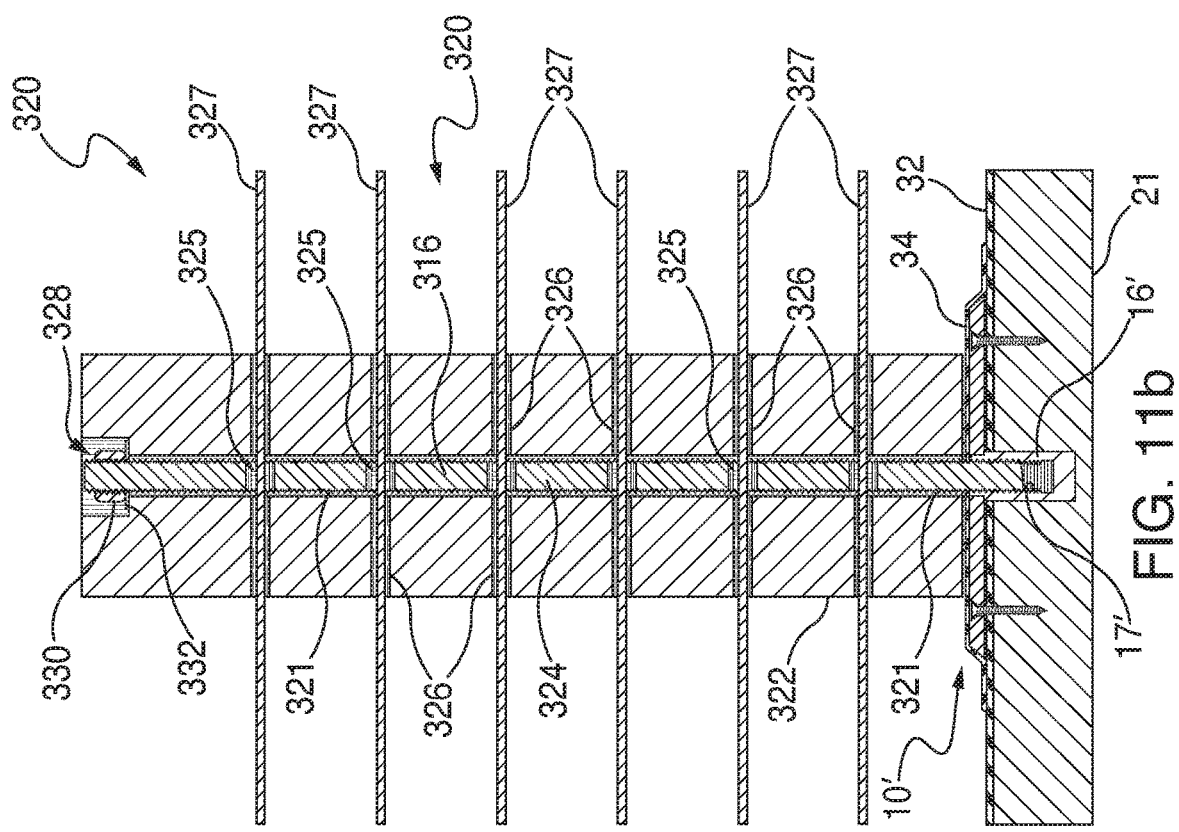
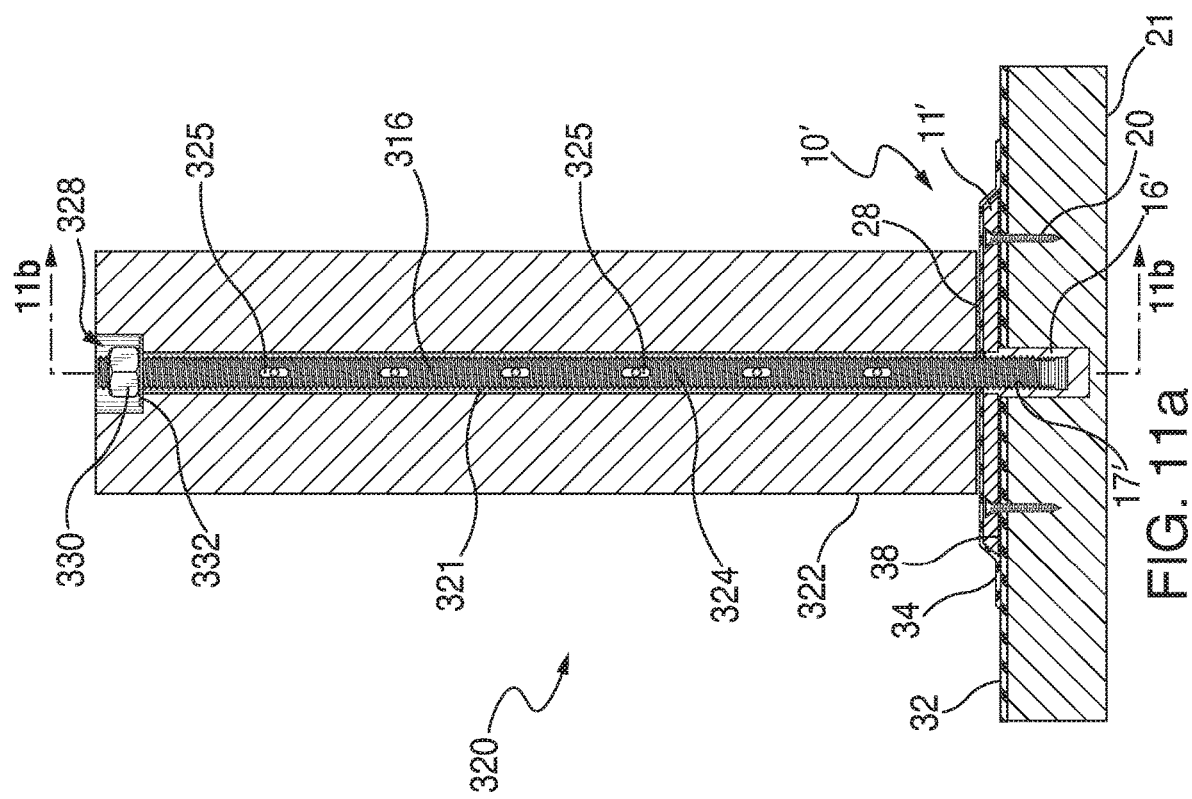
FIG. 11a
FIG. 11b

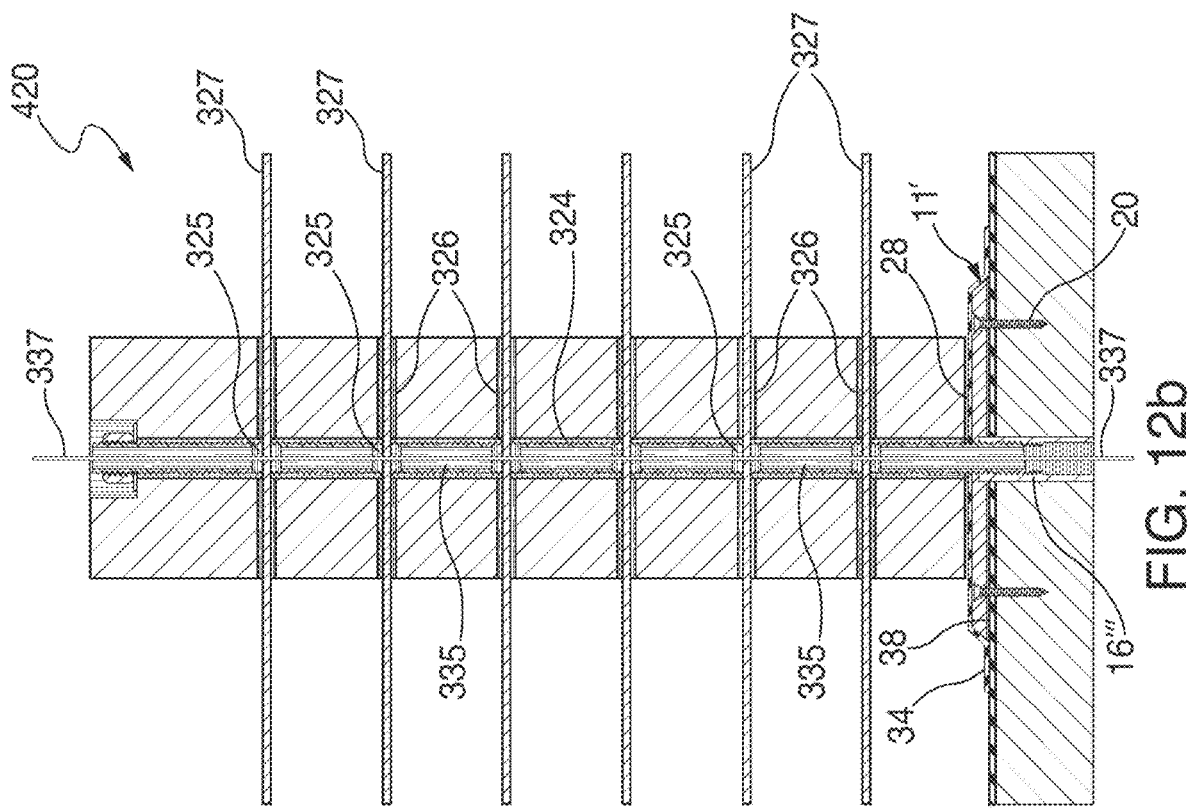
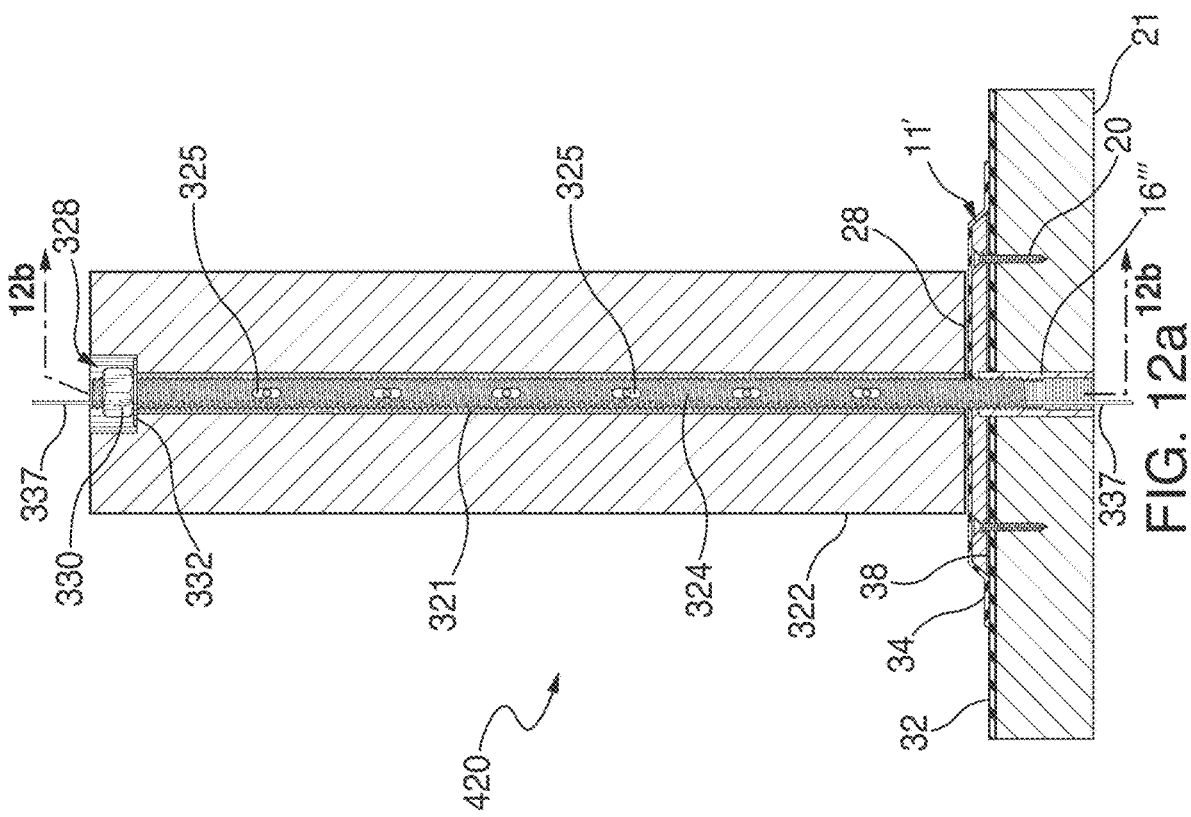

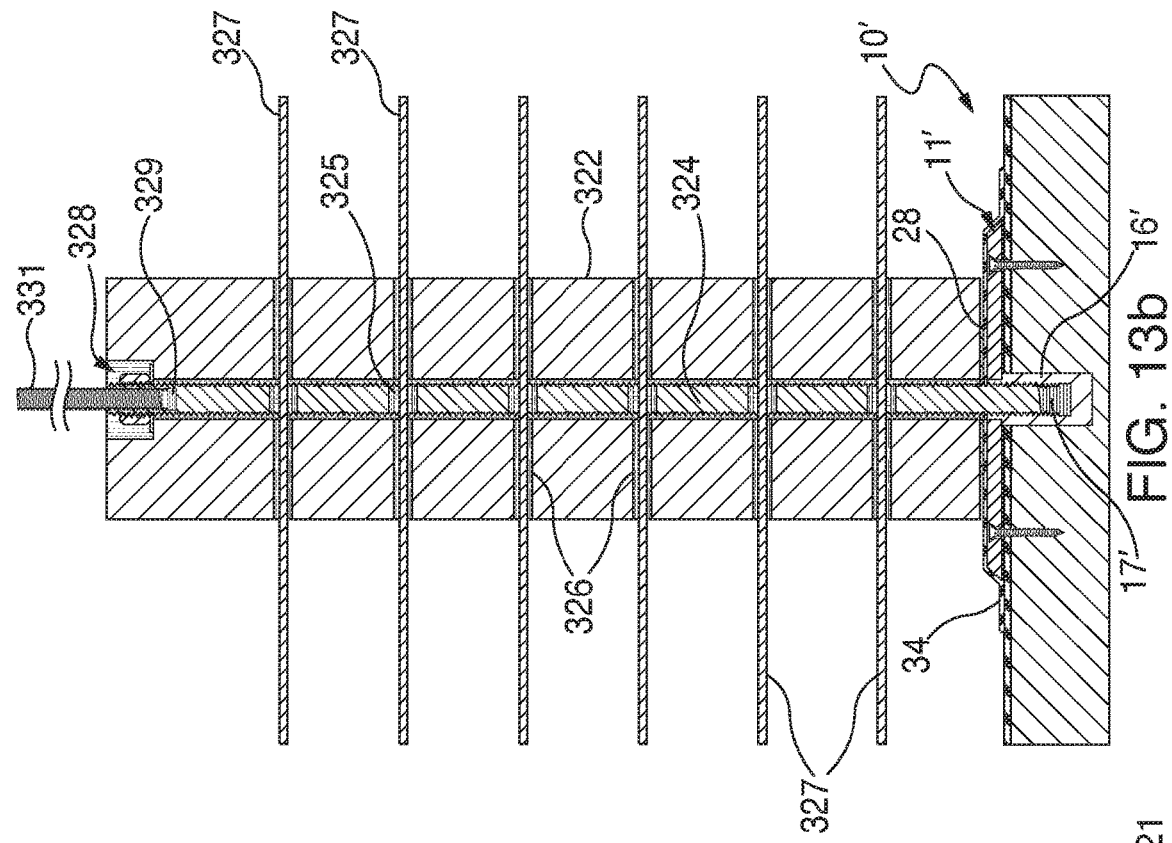
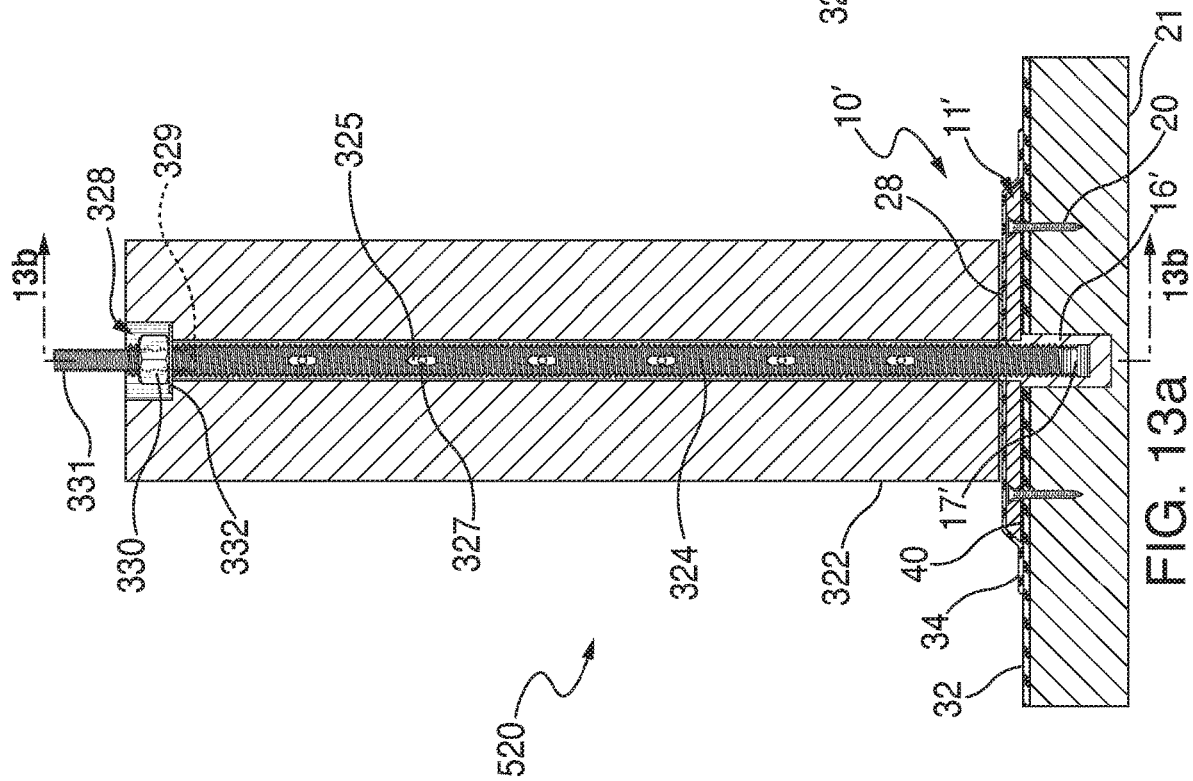

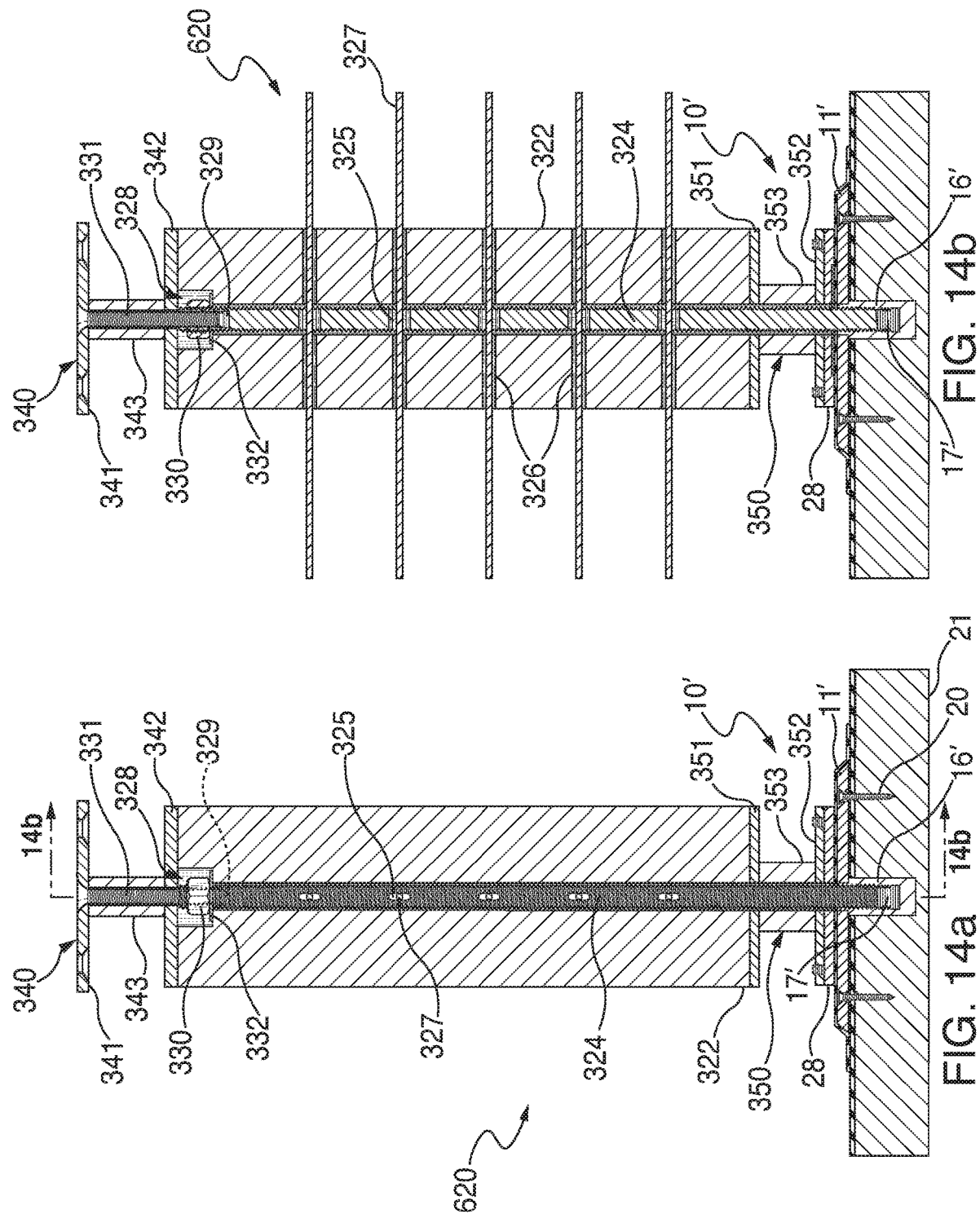

ANCHOR AND RAILING ASSEMBLY

CROSS-REFERENCE TO RELATED APPLICATIONS

This application is a continuation-in-part of U.S. Continuation patent application Ser. No. 16/677,236, filed Nov. 7, 2019; which in turn is a continuation-in-part of U.S. PCT Application No. PCT/US19/49549, filed Sep. 4, 2019; which in turn is a continuation-in-part of U.S. PCT Patent Application No. PCT/US19/46201, filed Aug. 12, 2019; which in turn is a continuation-in-part of U.S. PCT Patent Application No. PCT/US19/43264, filed Jul. 24, 2019; which in turn is a continuation-in-part of U.S. PCT Patent Application No. PCT/US19/26058, filed Apr. 5, 2019; which in turn is a continuation-in-part of U.S. PCT Patent Application No. PCT/US2019/018592, filed Feb. 19, 2019; which in turn is a continuation-in-part of U.S. PCT Patent Application No. PCT/US18/65465, filed Dec. 13, 2018; which in turn is a continuation-in-part of U.S. patent application Ser. No. 15/852,733, filed Dec. 22, 2017 (U.S. Pat. No. 10,501,939, issued Dec. 10, 2019).

This application further claims the benefit of priority with respect to U.S. Provisional Patent Application Ser. No. 62/805,684, filed Feb. 14, 2019; U.S. PCT Patent Application No. PCT/US19/18592, filed Feb. 19, 2019; U.S. PCT Patent Application No. PCT/US19/26058, filed Apr. 5, 2019; U.S. PCT Patent Application No. PCT/US19/43264, filed Jul. 24, 2019; U.S. PCT Patent Application No. PCT/US19/46201, filed Aug. 12, 2019; U.S. PCT Patent Application No. PCT/US19/49549, filed Sep. 4, 2019; and U.S. Continuation patent application Ser. No. 16/677,236, filed Nov. 7, 2019.

FIELD OF THE INVENTION

The invention relates to an anchor and railing assembly for anchoring railings, balustrades, fences, and the like to flat roofs and other flat structures, such as roof decks, terraces, open balconies, walkways, and the like, as well as inclined surfaces such as stairs and ramps for both indoor and outdoor use, while providing both strength and/or watertight performance.

BACKGROUND OF THE INVENTION

Various methods for mounting and waterproofing roof equipment, accessory structures or the like, such as railings, fences, guard rails, etc., which are attached to sloped or flat roofs, building terraces, roof decks, stairways and ramps etc. are well known. In the roofing industry, there are many problems with water infiltration equipment and accessory attachment points, particularly when flashing is not incorporated and/or sealants are solely relied on. A variety of sheathing methods and combinations thereof are used as a water and moisture barrier on such structures such as asphalt roof tiles, poured or sheeted plastic or rubber membranes and the like. Currently, more and more heavy roof structures are being mounted on roofs such as, e.g., solar panels, satellite dishes, HVAC equipment, and especially for roof decks, balconies, terraces and the like, glass walls and/or railings are being mounted to avoid viewing obstructions such as would normally be the case with a wooden, cable or metal fence. These generally heavy structures must also be anchored to the roof structures, but because of the loads they generate and the manner in which they are mounted, typically with anchors bolted through the roof, they create a "conduit" for water to penetrate through the roof, notwithstanding the fact that the adhesive and glue are often used to seal the conduit in an attempt to prevent such water penetration. In fact, over time, these heavy structures as a result of normal repetitive roof movement or shifting caused by, e.g., settling, temperature changes, and/or high winds, cause cracks in the adhesive or glues employed and cause eventual roof leaks. As a result, it is difficult for many of the installers to provide guarantees or obtain insurance against water or moisture damage caused by such conventional anchoring systems.

The present invention seeks to overcome this problem by providing a novel anchoring system which avoids such problems in an advantageous and effective manner.

Likewise, conventional methods for mounting railings on structures including roof structures, particularly mounting radius posts or balusters, require passing the post through the structure, for example, in the case of a roof structure, passing the post through the roof's sheathing to be bolted to a beam or rafter, thereunder. While installing a standard (e.g., square) post to a beam or rafter is challenging, installing (i.e., attaching) a radius post to a beam or rafter is more difficult because a round piece of wood (or other post material) is not able to sit plum against a flat surface of a beam or rafter. And while waterproofing a standard post is a challenge, waterproofing a radius post is very difficult, requiring, for example, a custom radius copper soldered flashing and is quite vulnerable to leaks.

Moreover, conventional methods for mounting posts for indoor applications, such as indoor stairs, open balconies, walkways, ramps or railings, where waterproofing is not needed lack simple but extremely robust, strong and rigid anchoring and fastening methods which afford easy replacement and re-usability of the same anchoring and fastening means when the railings and/or balusters need to be replaced.

Accordingly, it is an object of the present invention to provide a novel anchor and railing assembly for anchoring balustrades, fences, glass rails and/or other roof accessory structures and/or posts or balustrades of any geometry (such as, e.g., square or rectangular, round, triangular, etc.), to structures such as roofs and the like, which can accommodate heavy loads and provide waterproof protection at the equipment or post attachment points.

It is a further object of the present invention to provide such a novel anchor and railing assembly, which is relatively simple in design and construction, easy to install and replace or remove and is relatively inexpensive to make.

It is another object of the present invention to provide such a novel anchor and railing assembly, which together can be used for a variety of roofs or raised structures, including both flat roofs and pitched roofs, as well as roof decks, outdoor balconies, terraces, stairs, ramps and the like.

It is still another object of the present invention to provide such a novel anchor and railing assembly, which is more reliable than prior art systems in providing a waterproof connection at the assembly attachment points.

It is a more particular object of the present invention to provide such a novel anchor and railing assembly, which is adaptable for indoor use as well, where waterproofing is not necessary, but a simple yet sturdy, strong, highly effective and rigid anchoring and fastening assembly is needed.

SUMMARY OF THE INVENTION

Certain of the foregoing and related objects are achieved according to the present invention by the provision of an anchor railing assembly for anchoring a railing to a structure, which includes an anchor baseplate having a top surface and a bottom surface, and a bore extending at least partially from said top surface generally towards said bottom surface and with at least a portion of said bore being threaded; a baluster; means for fastening said baluster to said anchor baseplate via said threaded bore, with said means comprising a threaded mechanical fastener having a straight thread; and means for fastening said anchor baseplate to a structure.

Preferably, said assembly comprises a plurality of said anchor and railing assemblies, a plurality of balusters, each of which has a top end and a bottom end, and a plurality of threaded mechanical fasteners, each of which comprises a threaded rod for threadably securing said bottom end of each of said balusters to one of said anchor baseplates via said threaded bore thereof. Optionally, said baluster is made from a member selected from the group consisting of wood, metal, plastic, glass and a composite thereof.

In a preferred embodiment, the balusters each have a throughbore extending from said top end to said bottom end thereof and a threaded rod mounted in said baluster throughbore. Advantageously, said threaded rod has a top end portion and bottom end portion and said means for fastening said baluster to said anchor baseplate comprises a bottom end portion of said threaded rod. Optionally, the assembly additionally includes at least one shim plate having a throughbore by which it is mounted on said threaded mechanical fastener and disposed between said baluster and said anchor baseplate. Desirably, said top end of each of said balusters has a recessed tubular cut-out defining an inner step surrounding an opening onto said baluster throughbore and wherein said assembly additionally includes means for supporting said threaded rod on said inner step. Preferably, said means for supporting comprises a nut receivable on a top end portion of said threaded rod.

In a further embodiment of the invention, means are provided for rotating said threaded rod to enable threaded engagement of said threaded rod with said threaded throughbore of said anchor baseplate. The means for rotating are optionally disposed on said top end portion of said rod. Most advantageously, said means for rotating comprises a member selected from the group consisting of a recessed flat head screw port, an Allen key port and a rotatable-tool receiving port.

Preferably, a cover is provided for said balusters. The cover may comprise an elongated top rail extending over a plurality of balusters. Alternatively, said cover comprises a post cap.

In a particularly preferred embodiment, said baluster comprises a hollow baluster defining an inner tubular chamber and having a pair of spaced-apart, generally horizontally-extending upper and lower support walls mounted adjacent to said top and bottom ends thereof, respectively, each having a central opening through which said threaded rod may pass. Advantageously, said lower support wall is coupled to said bottom end of said baluster and has an outer flange extending radially outward from said baluster having a plurality of spaced-apart, threaded throughbores extending therethrough and wherein said assembly additionally includes a plurality of set screws, each of which is threadably received in an opposite one of said threaded throughbores of said outer flange to adjust vertical alignment of said baluster to said anchor baseplate. Desirably, said threaded rod has a centering collar received thereon adjacent to said bottom end portion of said threaded rod.

In one particular embodiment, said balusters and said threaded rods thereof, each have a plurality of aligned and vertically-spaced-apart, horizontally-extending cable throughbores extending therethrough. The assembly additionally includes a plurality of cables extending through said cable throughbores of said balusters and said threaded rods thereof. The cables extend between and through balusters adjacent to one another. Optionally, said threaded rod of at least one of said balusters has a conduit extending from its top end to said bottom thereof. The top end of said threaded rod may have an internally-threaded bore, and a threaded accessory support rod which is threadably receivable in said rod internally-threaded bore.

In yet a further embodiment, said assembly additionally includes a top rail accessory support having a spool-like profile mounted on said accessory support rod and/or a spool-like support secured to said bottom end of said baluster. In another preferred embodiment, said anchor baseplate additionally includes a second post having a top end and a bottom end, the latter of which is secured to said top surface of said anchor baseplate. The second post has a pair of internally-threaded blind bores opening onto said opposite ends thereof, and wherein said bottom end portions of said threaded rods of said balusters are each threadably receivable in said internally-threaded bore in said top end of said second post.

In a yet further advantageous embodiment said baluster is a glass rail. The means for fastening said baluster to said anchor baseplate via said bore is an elongated U-shaped support channel in which said glass rail is at least partially received. The U-shaped support channel has a basewall with a throughbore and a threaded fastener receivable through said basewall throughbore and threadably receivable in said bore of said baseplate. A glass rail balustrade comprises a plurality of said anchor and railing assemblies, a plurality of balusters, each of which has a top end and a bottom, end and a plurality of threaded mechanical fasteners, each of which comprises a threaded bolt for threadably securing said glass rail supporting an elongated U-shaped support channel to one of said anchor baseplates via said threaded bore thereof.

In a preferred embodiment, the anchor baseplate is rectangular, the blind bore is generally centrally-disposed in the anchor baseplate and the anchor baseplate has a plurality of spaced-apart, ancillary through holes spaced from the blind bore and disposed generally adjacent to the periphery of the anchor baseplate. Most advantageously, the assembly includes a plurality of mechanical fastening members, each receivable through one of the ancillary holes for fastening the anchor baseplate to the structure and a mechanical fastener threadably receivable in the centrally disposed threaded blind bore for anchoring an object thereto. Preferably, the plurality of mechanical fastening members are screws and the mechanical fastener member receivable in the centrally-disposed threaded blind bore is a threaded bolt with an enlarged head and a threaded stem having said straight thread. Most desirably, said means for fastening said anchor baseplate to the support structure is configured and dimensioned so that said bottom surface thereof lies generally flush against at least a portion of the support structure except for the area of said bottom surface covered by said screw post.

In a particularly preferred embodiment of the invention, the anchor baseplate additionally includes an elongated post depending from the bottom surface thereof in which the blind bore is at least partially defined, with the post having a top end secured to the bottom surface of the anchor baseplate and a closed bottom end. Desirably, the anchor baseplate post is cylindrical and may optionally be either smooth or at least partially externally threaded. In the latter case, a nut is receivable on the externally threaded post for securing the anchor platform assembly to the structure from below. Most desirably, the anchor baseplate has a centrally-disposed, non-threaded bore and the post has a reduced diameter neck portion adjacent its top end which is configured and dimensioned for receipt within the centrally-disposed, non-threaded bore.

Preferably, the anchor platform assembly also includes a U-shaped object support member for supporting a glass rail having a base wall and a bore formed therethrough which is positionable on said anchor baseplate so that the base wall bore is aligned with said threaded blind bore. Preferably, the tubular body member having opposing sidewalls, each having a throughbore aligned with the throughbore in the opposing sidewall.

In another particularly preferred embodiment of the present invention, the anchor baseplate has a generally solid shape and comprises a generally planar top wall defining the top surface of the anchor baseplate and a generally planar bottom wall defining the bottom surface. Most desirably, the anchor baseplate is generally square-shaped and has a generally frusto-pyramidal shape and has four sloping sidewalls extending between the top and bottom walls, and the sidewalls each have a recessed cutout and a throughbore extending from each of the recessed cutouts to the bottom surface of the bottom wall. Additionally, means are provided for mechanically fastening the anchor baseplate to a structure via the throughbores of the sidewalls.

In another preferred embodiment, the post comprises a screw having an at least partially-threaded shaft in which said threaded blind bore is disposed. Advantageously, the anchor baseplate is in the form of a flange. The flange is a generally circular, planar flange. Advantageously, a polygonally-shaped nut having a throughbore is affixed to the top surface of said flange with its throughbore in axial alignment and registry with said blind bore of said shaft of said screw. Desirably, said polygonally-shaped nut is a hexagonally shaped nut. Optionally, the screw has an upper tubular neck portion having a throughbore with an open top end and open bottom end, and wherein said bottom open end thereof merges with a threaded bore within a lower externally-threaded shaft portion which together define said at least partially threaded blind bore of said post. Preferably, said throughbore of said neck portion is at least partially threaded.

In another particularly preferred embodiment of the screw anchor, said blind bore has a longitudinally-extended axis and said assembly additionally includes means for rotating said screw anchor about said axis of said blind bore. The means for rotating may comprise a port formed adjacent and within said open top end of said tubular neck portion which is configured and dimensioned to accommodate a tool for rotating said anchor into a structure. The port may be configured and dimensioned as a flat head screw slot or as an Allen key port.

Certain of the foregoing and related objects are also achieved in an anchor and railing assembly for anchoring a railing to a structure, which comprises an anchor baseplate having a planar top surface and a planar bottom surface, and a threaded post having a straight thread, with said threaded post secured to said anchor baseplate, a baluster having a bottom end with a threaded bore formed therein by which said baluster is threadably mounted on said post, and means for fastening said anchor baseplate to a structure. Preferably, the baluster has a top end with a threaded bore formed therein, and the assembly additionally includes a top rail having at least one throughbore and a threaded bolt received through said top rail throughbore and threaded into said threaded bore of said top end of said post.

In a particularly preferred embodiment especially intended for applications where water proofing is not necessary, such as indoor applications for e.g., balusters for indoor stairs and railings, the anchor platform assembly also performs extremely well in providing a simple yet sturdy, strong, rigid, anchoring and fastening assembly via the same assembly as described above in connection with outdoor applications, such as roofs, but where the blind bore could be replaced with a throughbore and still achieve the same anchoring and fastening strength.

BRIEF DESCRIPTION OF THE DRAWINGS

Other objects and features of the present invention will become apparent from the detailed description considered in connection with the accompanying drawings, which disclose several embodiments of the invention. It is to be understood that the drawings are to be used for the purpose of illustration only and not as a definition of the limits of the invention.

FIG. 8b is a plan view of the anchor and railing assembly shown in FIG. 8a;

FIG. 8c is a side view of the anchor and railing assembly shown in FIG. 8a;

FIG. 9b is a side elevational view, in part section, of the flush screw assembly shown in FIG. 9a;

FIG. 9f is a side elevational view, in part section, of a flush screw assembly similar to FIG. 9b, but showing the optional provision of an Allen key port;

FIG. 9g is a top plan view of the flush screw assembly shown in FIG. 9f;

FIG. 9h is a side elevational view of a combined hex head screw anchor and fastener assembly according to a sixth embodiment of the present invention;

FIG. 9i is a side elevational view, in part section, of the hex head screw anchor assembly shown in FIG. 9h;

FIG. 9j is a top plan view, in part section, of the hex head screw anchor assembly shown in FIG. 9h;

FIG. 11a is a cross-sectional view of an eighth embodiment of the present invention wherein the baluster is provided with an axially-extending threaded rod having a plurality of spaced-apart, laterally-extending throughbores for supporting a plurality of spaced-apart, horizontally-extending cables;

FIG. 11b is a cross-sectional view of the embodiment shown in FIG. 11a, taken along line 11b-11b thereof;

FIG. 13a is a cross-sectional view of an embodiment of the present invention wherein the threaded rod is formed with a full-length pass through;

FIG. 13b is a cross-sectional view of the embodiment shown in FIG. 12a, taken along line 13b-13b thereof;

FIG. 12a is a cross-sectional view similar to that of the FIG. 11a embodiment, but where the baluster includes a threaded port at its top end into which a second threaded rod may be threaded or otherwise attached;

FIG. 12b is a cross-sectional view of the embodiment shown in FIG. 12a, taken along lines 12b-12b thereof;

FIG. 13a is a cross-sectional view of an embodiment similar to FIG. 12a, but the employment of a hollow threaded rod which serves as a full-length passthrough;

FIG. 13b is a cross-sectional view of the embodiment shown in FIG. 13a taken along line 14b-14b thereof;

FIG. 14a is a cross-sectional view similar to FIG. 11a, except that the top and bottom of the baluster are each provided with a spindle-like extension;

FIG. 14b is a cross-sectional view of the embodiment shown in FIG. 14a taken along line 15b-15b thereof;

DETAILED DESCRIPTION OF THE PREFERRED EMBODIMENTS

Figure 1:
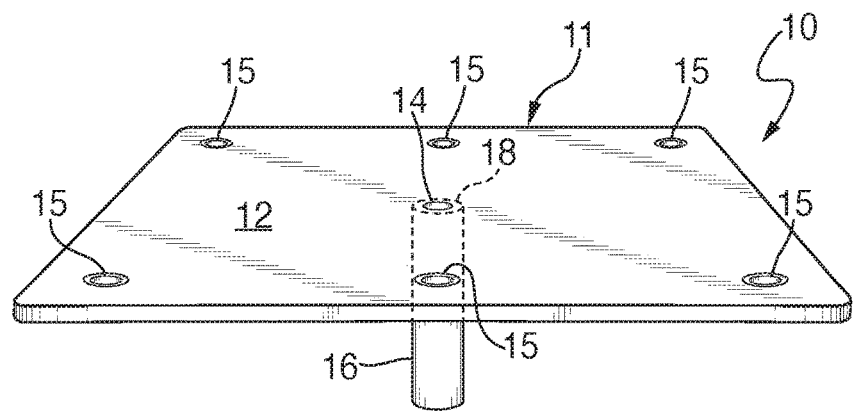
FIG. 1 is a top and side perspective view of a first embodiment of an anchor baseplate utilized in an anchor and railing assembly embodying the present invention.
Figure 2:
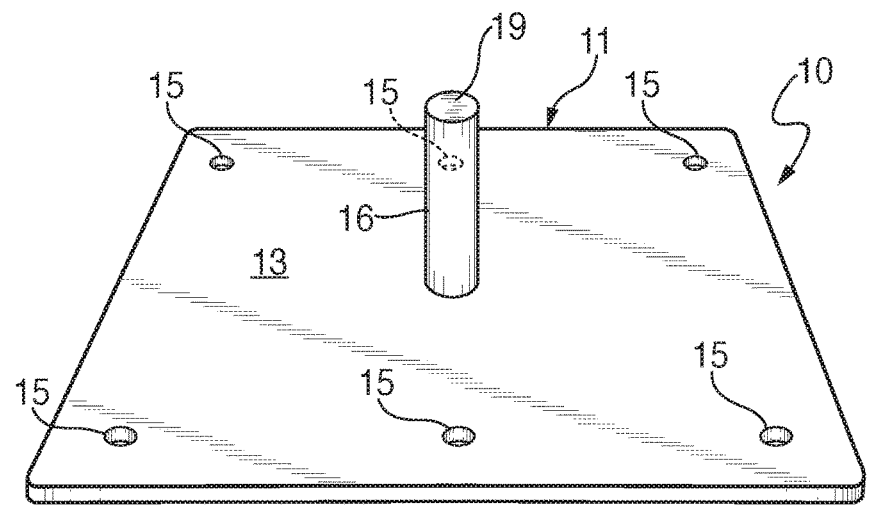
FIG. 2 is a bottom and side perspective view of the anchor baseplate shown in FIG. 1.

Turning now in detail to the drawings and, in particular, to FIGS. 1-7b thereof, therein illustrated is a novel anchor and railing assembly embodying the present invention, as more particularly described and shown in Applicant's aforementioned U.S. patent application Ser. No. 15/852,733 and Application No. PCT/US2019/018592 for anchoring objects to a support structure, especially intended for a wide variety of anchoring applications which are universally adaptable to many different fields of use.

FIGS. 1-4c thereof illustrates a first embodiment of the present invention which comprises a novel anchor and railing assembly, generally designed by reference numeral 10, especially designed for anchoring roof accessory structures to roofs and other raised, flat and/or pitched structures, such as terraces, balconies, stairs and the like. The main component of the anchor and railing assembly is the anchor baseplate, generally designated by reference numeral 11, which preferably is made of stainless steel (but could be made of other metals, such as aluminum, bronze, etc.), and is preferably square or rectangular shaped and has a top surface 12 and a bottom surface 13. The anchor baseplate 11 has an internally-threaded central through bore 14 and six spaced apart peripheral through bores 15 positioned radially outward from the center bore 14 and generally adjacent to the periphery of the baseplate 11. In this embodiment, the anchor baseplate 11 also includes a preferably cylindrical rod or post 16 having an axially-extending, internally-threaded bore 17 (see FIG. 4b) having a top open end 18 and a closed bottom 19 (FIG. 2) the former of which is secured preferably via welding to the anchor baseplate 11 so that the top open end of its bore 17 abuts and is in registry with the bottom open end of center through bore 14 of anchor baseplate 11 (see FIG. 4b).

Figure 3:
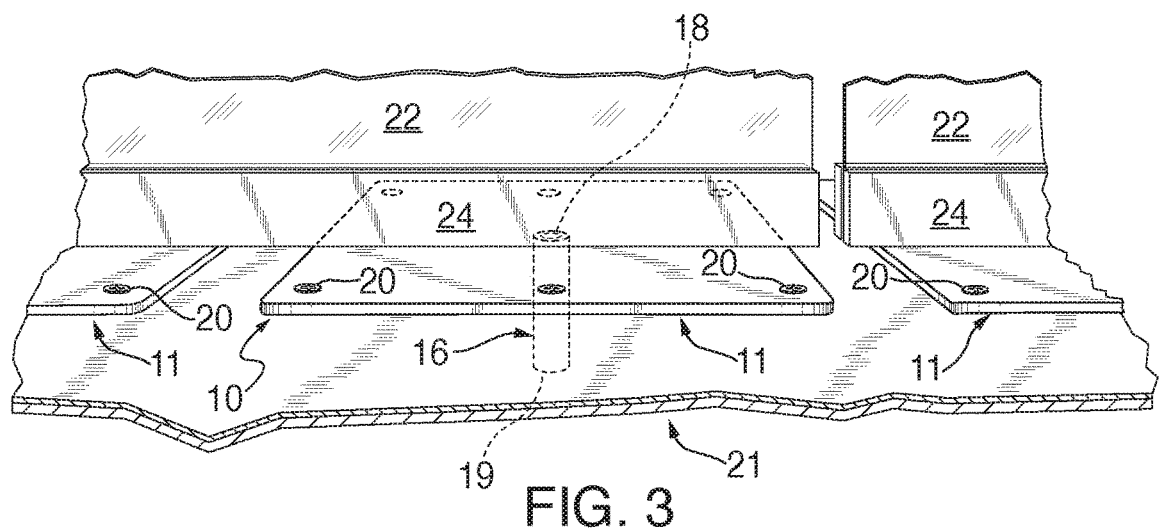
FIG. 3 is fragmentarily-illustrated, perspective view of a first embodiment of the anchor and railing assembly embodying the present invention employing a plurality of serially-arranged anchor baseplates mounted on a roof deck and anchoring thereto a plurality of spaced-apart, elongated rails each having a U-shaped channel or shoe in which, is mounted a glass railing.

As shown in FIG. 3, the anchor baseplate 11 of the anchor and railing assembly 10 is typically mounted via mechanical fastening elements 20 preferably in the form of nails, bolts, or lag screws, to a roof structure, such as a roof deck, generally designated 21, with its cylindrical post 16 extending through the roof deck 21 and projecting below the roof deck with its closed end 19. The internally threaded and aligned bores 14 and 17 serve as an anchor point for an object to be mounted on the roof deck 21. In this case, the object is a glass railing of the type that has glass panel 22 with a lower edge secured within an elongated U-shaped metal channel or shoe 24. FIG. 3 specifically depicts three serially arranged and spaced apart anchor baseplates 11 to which two glass panels 22 and two shoes 24 are at least partially mounted. In use, such glass railings can be hundreds of feet in length. As can be appreciated, depending on the length of each glass railing 22, two or more anchor baseplates 11 per glass rail 22 may be required as shown in FIG. 3.

Figure 4A:
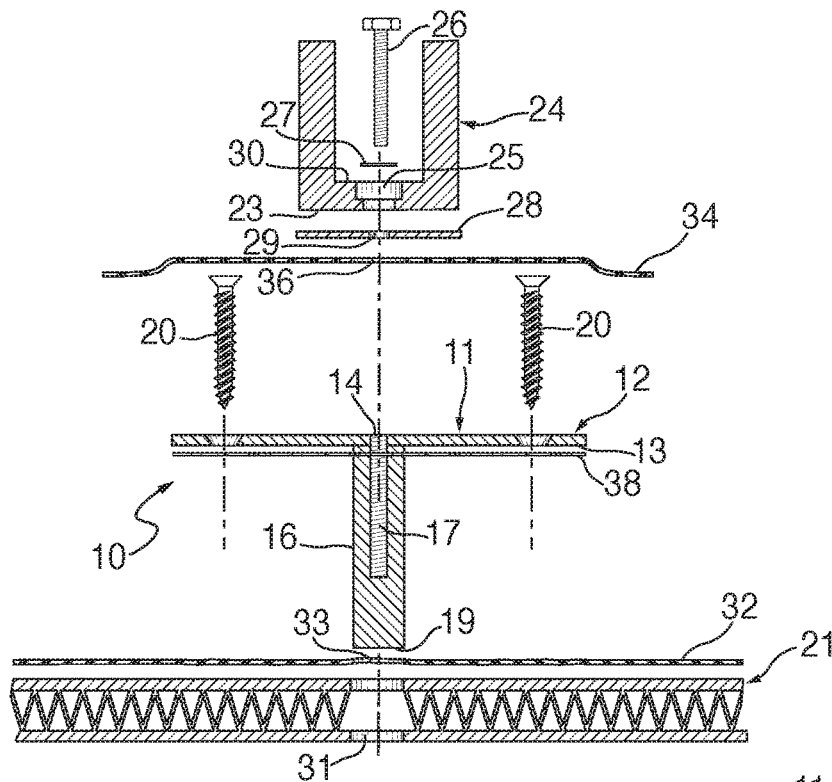
FIG. 4a is an exploded, cross-sectional view of the anchor and railing assembly including the anchor baseplate and shim plate shown in FIG. 4a in positional relationship with respect to the U-shaped shoe and the roof deck shown in FIG. 3 and further showing the roof flashing associated therewith including an anchor baseplate membrane and a roof membrane, and the fastening means employed therewith.
Figure 4B:
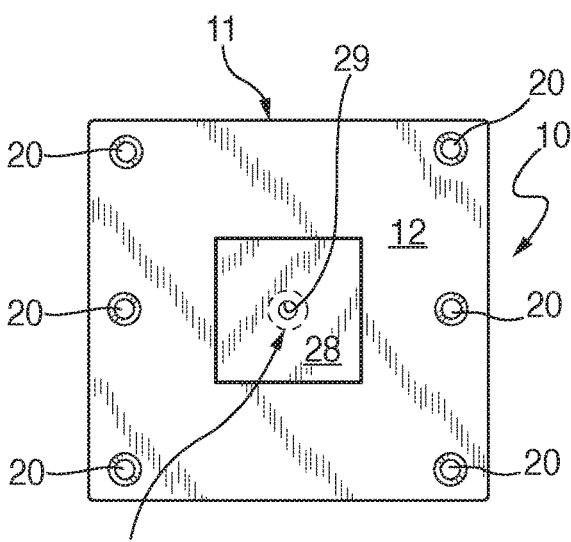
FIG. 4b is a plan view of the anchor baseplate and an optional shim plate centered thereon for adjusting the height of the rail.
Figure 4C:
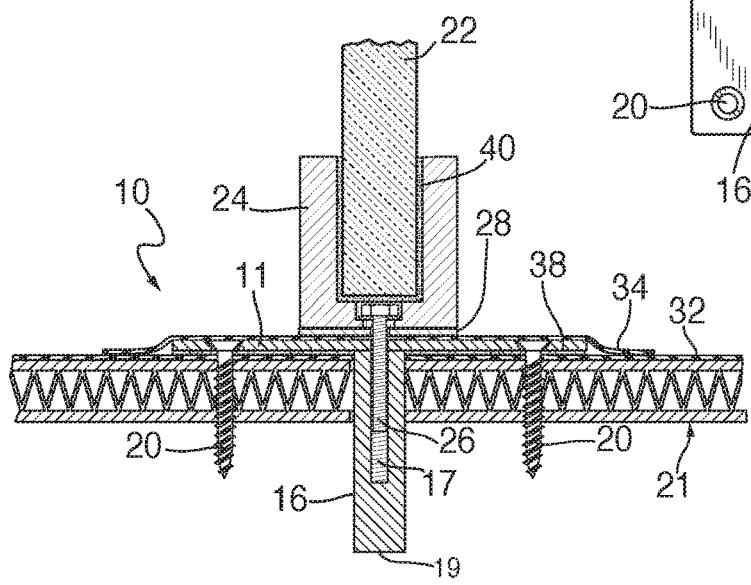
FIG. 4c is a cross-sectional view of the anchor and railing assembly shown in FIG. 4b in a fully, mounted state on a roof deck whereby the glass rail is anchored via its U-shaped shoe to the roof, and also showing the use of flashing materials, fasteners and adhesives employed therewith.

As seen best in FIGS. 4a and 4c, an elongated U-shaped shoe 24 has a base wall 23 with a plurality of spaced apart through bores 25 (only one of which is shown). As will be discussed in greater detail hereinafter, mechanical fasteners are used, such as a threaded bolt 26, and washer 27, which bolt 26 is receivable through the through bore 25 of the U-shaped shoe 24 and is receivable within the internally-threaded center bore 14 of anchor baseplate 11 and internally-threaded blind bore 17 of the cylindrical post or rod 16 (FIG. 4c) to anchor the same to the roof deck 21. The cylindrical post 16 with the closed bottom 19 serves two purposes: (1) it provides a relatively sturdy and rigid anchoring support point for the object to be mounted on the roof, and (2) it prevents water from penetrating via the central bore 14 into and below the roof deck 21 as a result of blind bore 17 and the bottom end 19 of the cylindrical rod 16 being closed.

FIG. 4b shows the use of a square-shaped shim plate 28 having a central through bore 29 mounted atop the anchor baseplate 11 such that its central through bore 29 is directly over and in registry with the internal blind bore 17 of the cylindrical post 16. The shim plate 28 is used to adjust the height of the shoe 24 to ensure proper alignment of adjacent shoes 24 and the glass railing(s) 22 they support due to variations in height of the roof deck 21 or the like. Additional shim plates 28 can, of course, be used, if needed, to achieve proper height alignment.

As illustrated in FIGS. 4a and 4c, the central throughbore 25 of the U-shaped channel or shoe 24 contains a step which is dimensioned and configured to receive and support the bolt head of bolt 26 and washer 27 on the step so that the bolt head of bolt 26 is disposed below the top surface 30 of the lower base wall 23 of U-shaped shoe 24 so as not to abut and possibly crack or damage the bottom edge of the glass railing 22.

FIGS. 4a and 4c respectively show an exploded cross-sectional view and a fully mounted cross-sectional of the anchor and railing assembly 10 which include preferred flashing materials, fasteners and adhesives and the like for mounting a glass railing to a roof deck or terrace or the like. As shown in FIG. 4a, the anchor baseplate 11 is positioned above the roof deck 21 which may be of wood, metal or composite construction as is standard or conventional in the industry. The cylindrical post 16 of the anchor baseplate 11 is intended to be inserted through a through bore 31 in the roof deck 21 and a throughbore 33 of a conventional rubber roof membrane 32, preferably made of neoprene, and preferably interposed between the anchor baseplate 11 and roof deck 21. Similarly, a conventional rubber roof membrane 34, also preferably made of neoprene, is preferably positioned between the optional shim plate 28 and the top surface 12 of the anchor baseplate 11 and it too is provided with a central bore 36 to allow the bolt 26 to pass through the membrane 34. In addition, a sealant, cement, caulk or adhesive layer 38 is shown which would normally be applied to the bottom surface 13 of the anchor baseplate 11 to adhesively join and seal the same to the roof membrane 32.

As also shown in FIG. 4c, an adhesive, caulk, cement or glue 40 (and/or optionally clips) is also applied to the inner surface of the U-shaped channel 24 so that it surrounds the lower end of glass railing 22 received within the U-shaped metal channel 24. As also illustrated therein, the anchor baseplate membrane 34 extends over the entire anchor baseplate 11 with its ends sealed against the roof membrane 32 thereby sealing the screw holes and the remainder of the anchor baseplate 11. As can be appreciated, these flashing materials and adhesives serve to waterproof the assembly and protect the roof from leaks.

As previously mentioned, this is particularly important at the point of attachment of the object to the roof which, in this case, refers to the point of attachment of the glass railing shoe 24 to the anchor baseplate cylindrical post 16 via bolt 26 and the blind threaded bore 17 in which the bolt 26 is received. Since bore 17 is a blind bore or hole and the bottom 19 end of the cylindrical post 16 is closed, the potential path of any water that could conceivably penetrate between the glass panel 22 and the U-shaped channel 24 and enter the bore 17 of the cylindrical post 16 is totally blocked from penetrating the roof deck 21.

Figure 5A:
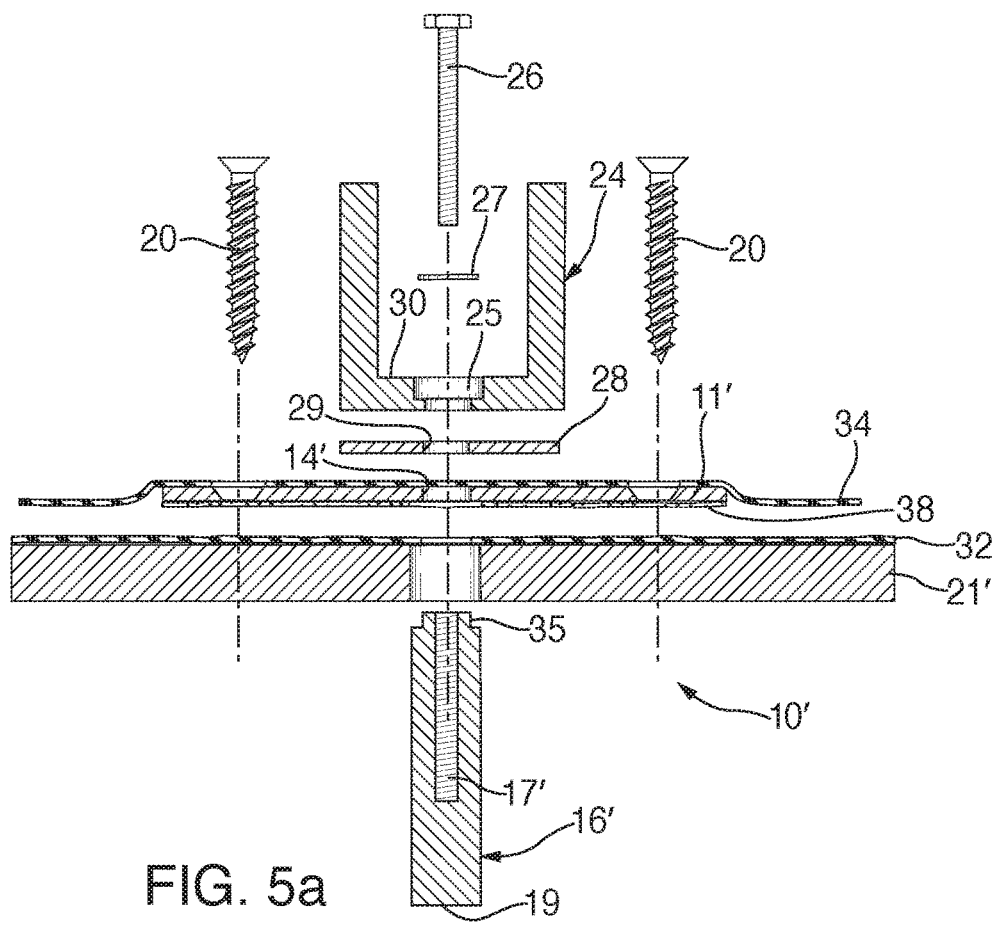
FIG. 5a is an exploded, cross-sectional view of a second embodiment of the anchor and railing assembly comparable to FIG. 4b, but showing the anchor baseplate having an internally threaded post with a reduced width neck section.
Figure 5B:
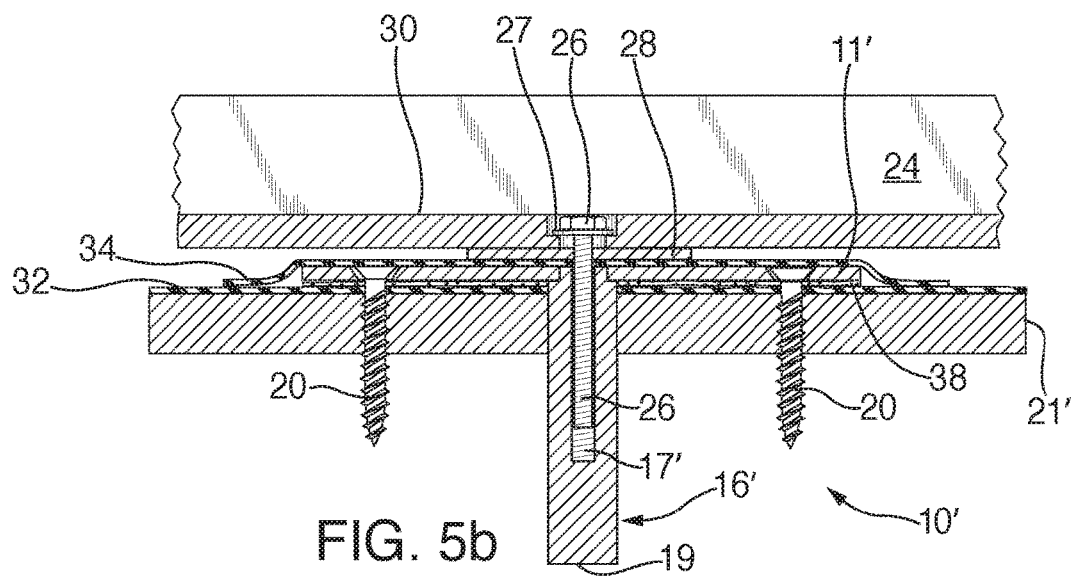
FIG. 5b is a cross-sectional view of the second embodiment of the invention in a fully mounted state comparable to FIG. 4c, but showing the use of an internally threaded post with a reduced width neck section seated within the central bore of the anchor baseplate.

FIGS. 5a and 5b illustrate a second embodiment of the anchor baseplate assembly 10' and, in a similar fashion, respectively show an exploded cross-sectional view and a fully mounted cross-sectional view of this second embodiment of the anchor and railing assembly 10'.

The elements shown in this second embodiment are the same as shown in FIGS. 4a and 4c with the exception that the cylindrical post 16' is provided with a narrow neck portion 36 and the baseplate 11' is provided with a non-threaded central bore 14', but both are otherwise identical to the baseplate 11 and cylindrical post 16 shown in the previous embodiment. In FIGS. 4a and 4c, the top end 18 of the cylindrical post 16 would typically be welded to the bottom surface 13 of the anchor baseplate 11. In FIGS. 5a and 5b, however, the narrow neck section 35 is intended to be received within the non-threaded central bore 14' of the anchor baseplate 11' and as a result of this construction, a more robust, and stronger bond is made. The stronger bond is due to the fact that when anchor plate 11' and post 16' are welded together, the respective center bore 14' and internal threaded bore 17' are being held in proper axial alignment by the reduced neck section 36 of the post 16' being received in, and extending into, the non-threaded central bore 14'.

Figure 6A:
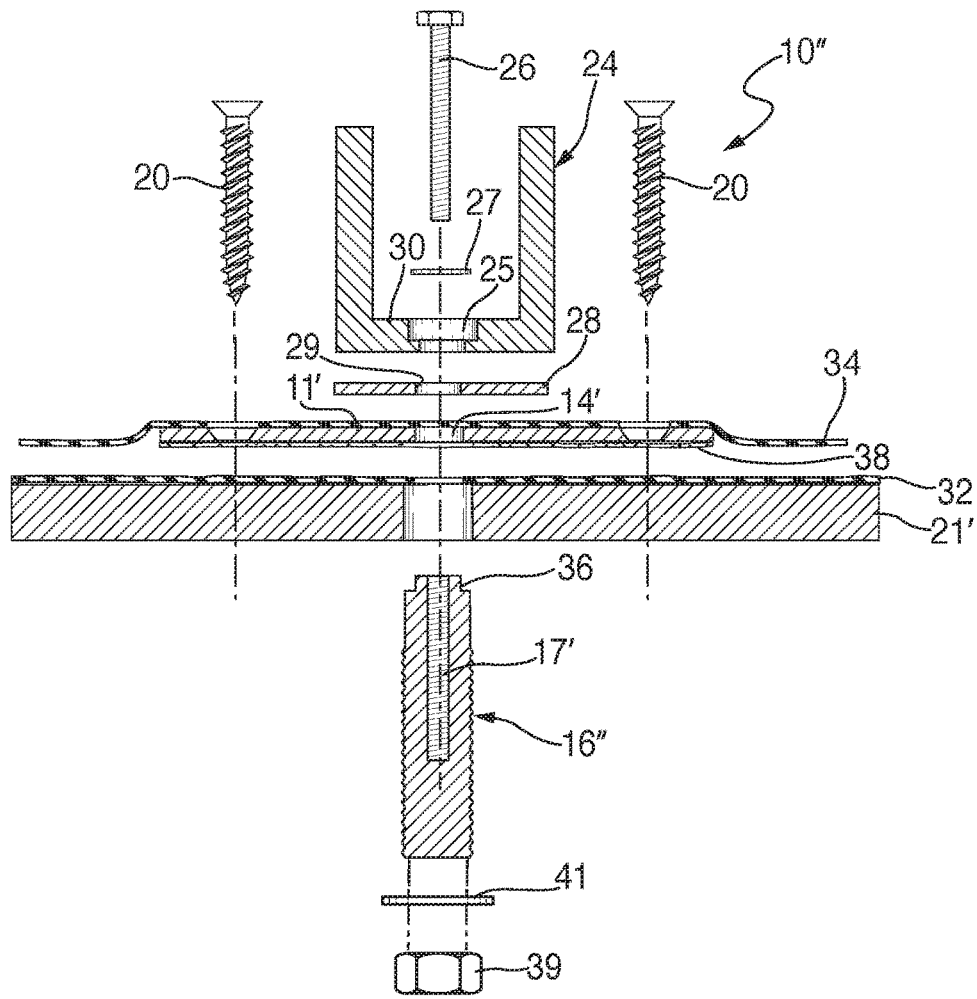
FIG. 6a is an exploded, cross-sectional view of a third embodiment of the anchor and railing assembly comparable to that shown in FIGS. 4b and 5a, but showing an anchor baseplate having an externally threaded post.
Figure 6B:
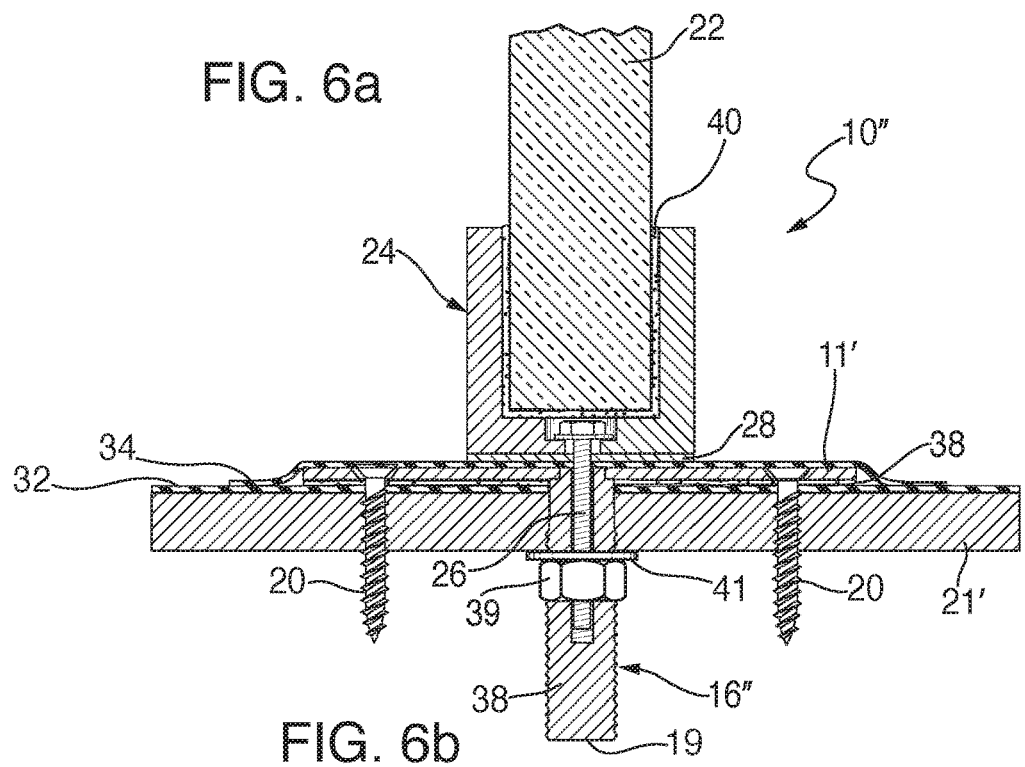
FIG. 6b is a cross-sectional view of the third embodiment of the anchor and railing assembly in a fully mounted state comparable to that of FIGS. 4c and 5b, but showing the partially-externally threaded post securing the anchor baseplate to the roof deck from beneath the roof deck via a nut and a washer.

FIGS. 6a and 6b illustrate a third embodiment of the anchor baseplate assembly 10" and, in a similar fashion, respectively show an exploded cross-sectional view and a fully mounted cross-sectional view of this third anchor and railing assembly embodiment. The elements shown in this third embodiment are the same as shown in FIGS. 5a and 5b with the exception that the lower portion 37 of cylindrical post 16" is externally threaded but is otherwise identical to the cylindrical post 16'. In this embodiment, a nut 39 and washer 41 are threaded onto the externally threaded surface 37 of the cylindrical post 16" so that in the fully assembled state shown in FIG. 6b, the nut 39 and washer 41 are tightened against the lower surface of the metal roof deck 21' to provide a stronger point of attachment while, at the same time, preventing roof leaks at the point of attachment via the blind bore 17' and the closed end 19 of the cylindrical post 16".

Figure 7A:
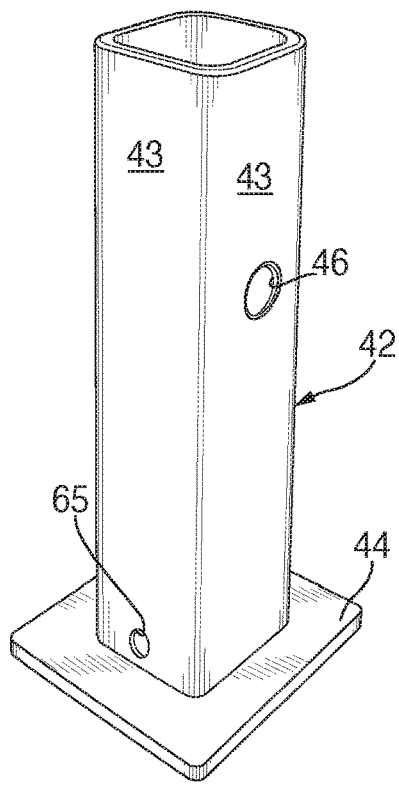
FIG. 7a is a perspective view of an anchor and railing assembly accessory unit embodying the present invention for supporting a roof accessory structure in an offset and raised arrangement relative to the anchor base platform and roof deck respectively.
Figure 7B:
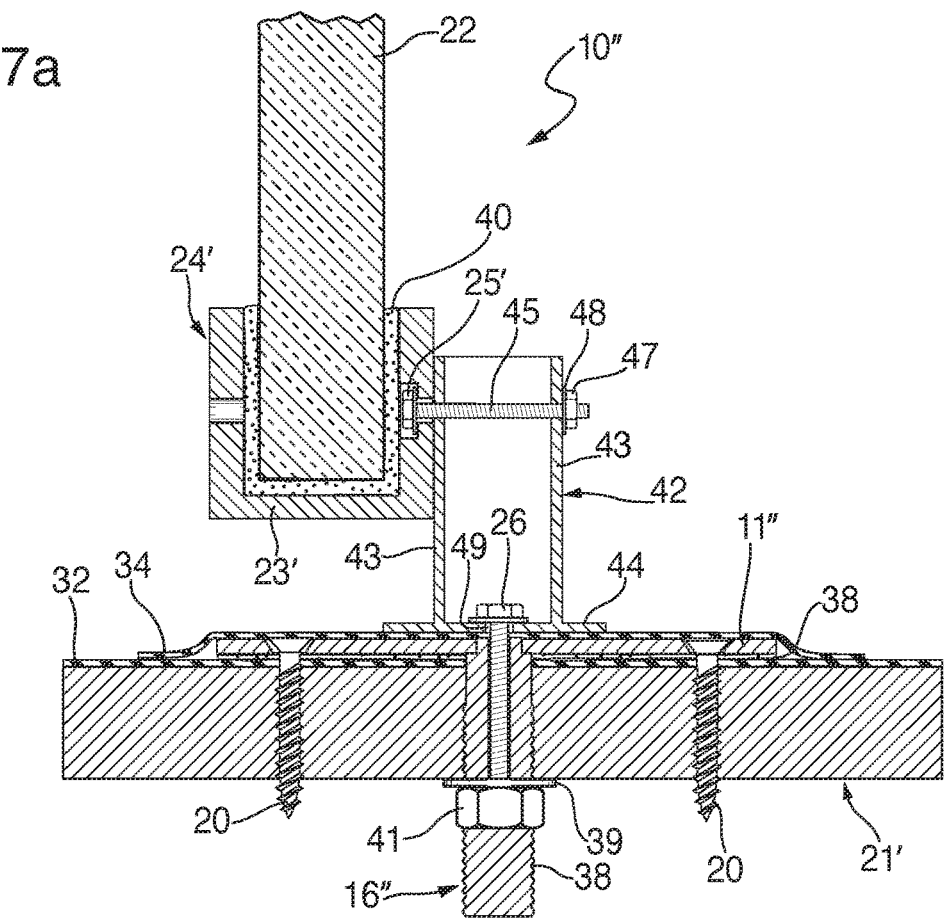
FIG. 7b is a cross sectional view similar to FIG. 6b, but showing the accessory unit supporting the glass railing and its supporting shoe in a raised position spaced above the roof deck and offset from the center hole in the anchor baseplate.

FIGS. 7a and 7b illustrate a novel accessory support stand 42 for the various anchor plate assemblies shown herein which allows the user to support an object in a raised and spaced manner above the anchor baseplate. The accessory support stand 42 comprising a preferably metal, square or rectangular planar base 44 and an upstanding preferably metal square-shaped, tubular body member composed of four sidewalls 43 joined at one end to the planar base 44 by welding. A weep hole 45 is provided at the base of one sidewall 43 to allow water to drain therefrom. The base 44 has a central hole 49 (FIG. 7b) which is alignable with the internally threaded bore 17' of the cylindrical post 16" and the threaded stem of bolt 26 is threadably received within the internally-threaded bore 17' to anchor the support stand 42 to the anchor baseplate 11". At least one set of horizontally aligned holes 46 are formed in opposite side walls 43 of the upstanding tubular body through which a threaded bolt 47 could be mounted to secure an object to one of the sidewalls 43 of the support stand 42 as shown best in FIG. 7b. In this case, the U-shaped channel 24' is provided with a recessed through bore 25' in one of its sidewalls rather than in its base wall 23' as shown in the embodiments of FIGS. 1-6. The bolt 47 is held in the recessed throughbore 25' via its bolt head being held against the step of the channel through bore 25' and at its opposite end (i.e., the free end of its threaded shaft extending through the sidewall hole 46) by an additional nut 47 and washer 48 to secure the U-shaped channel 24" in a raised and elevated position relative to the anchor baseplate 11" and roof member 21' and offset relative to the center blind bore of the anchor baseplate 11".

Figure 7C:
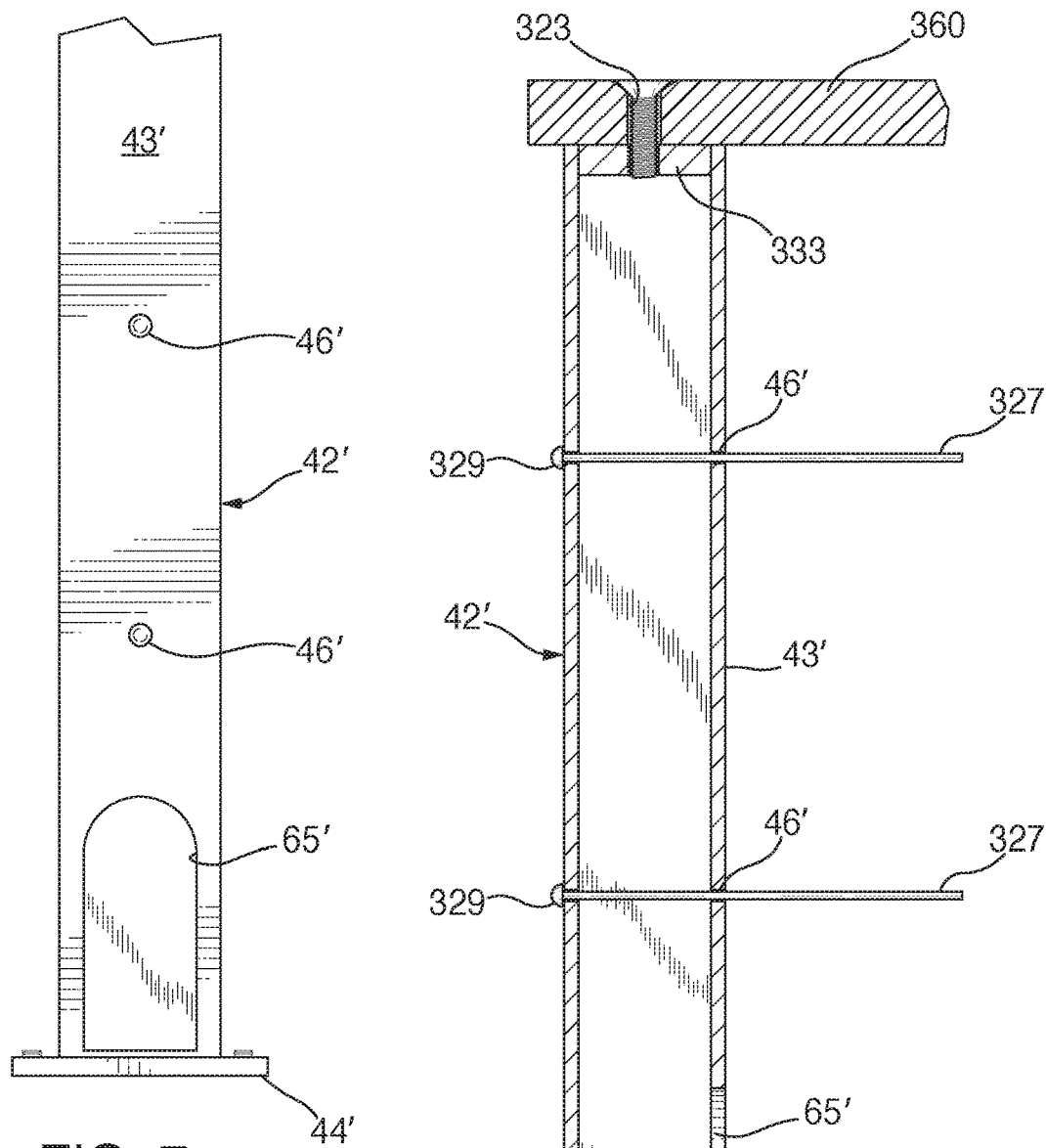
FIG. 7c is a fragmentarily-illustrated front elevational view of an anchor and railing assembly accessory unit similar to FIG. 7a, but in the form of an end post for a wire cable fence.
Figure 7D:
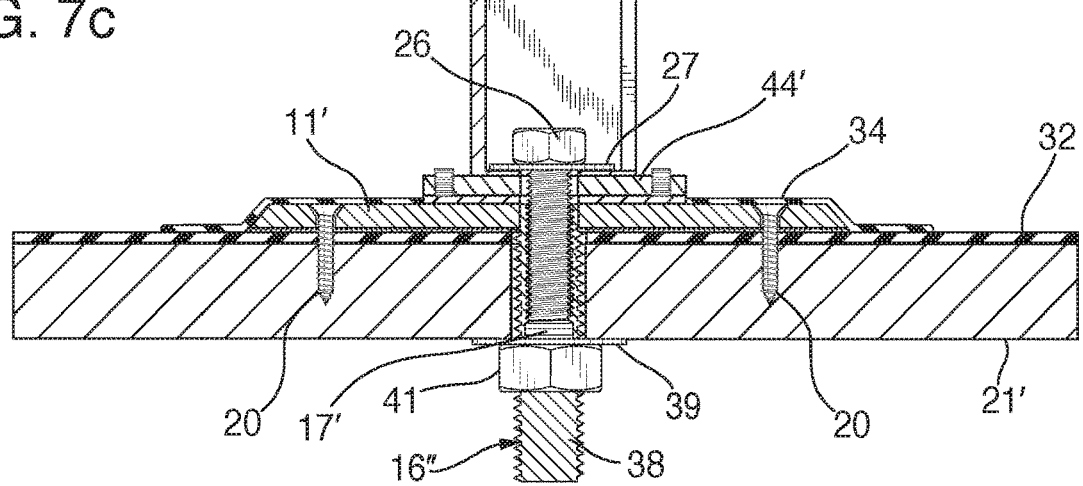
FIG. 7d is a cross-sectional view of the accessory unit shown in FIG. 7c shown in a fully mounted position on an anchor plate assembly of the type shown in FIG. 6b.

FIGS. 7c and 7d show a modified accessory support unit of the type shown in FIGS. 7a and 7b which serves as an end post for a wire cable type railing system. In particular as shown in FIG. 7c the accessory post 42'. The accessory support stand 42' comprises a preferably metal, square or rectangular planar base 44' and an upstanding preferably metal square-shaped, tubular body member composed of four sidewalls 43' joined at one end to the planar base 44' by welding. A large access hole 65' is provided at the base of one sidewall 43' to allow a wrench or other tool access to its inner chamber. The base 44' has a central hole 49 (FIG. 7d) which is alignable with the internally threaded bore 17' of the cylindrical post 16" and the threaded stem of bolt 26 is threadably received within the internally-threaded bore 17' to anchor the support stand 42 to the anchor baseplate 11".

As can be appreciated, a tool can be used to engage the head of the bolt 26 and tighten the bolt 26 down to secure the support 42' to the anchor baseplate 11'. As also shown in FIG. 7d, two pairs of horizontally aligned holes 46' are formed in opposite side walls 43' of the upstanding tubular body through each of which the end of a cable 327 passes and is secured via a conventional end cap 329. The end of a top rail 360 is secured to the top end of post 42' via a threaded bolt 339 received in a threaded bore in the horizontal top wall 340.

FIGS. 8a-8e disclose a fourth embodiment of the anchor and railing assembly 10'" wherein the anchor baseplate 11'" has a lower, square-shaped, planar base portion 50 and a frusto-pyramidal upper portion which defines four upwardly tapered sidewalls 51 and a square-shaped planar top wall 52. The top wall 52 has an internally threaded, centrally-disposed blind bore 54 and each of the sidewalls 51 have a recessed, generally cylindrical cutout or cavity 55 which opens onto a throughbore 56 which extends through the bottom portion 50 and in turn, opens on the bottom surface 57 thereof.

Figure 8A:
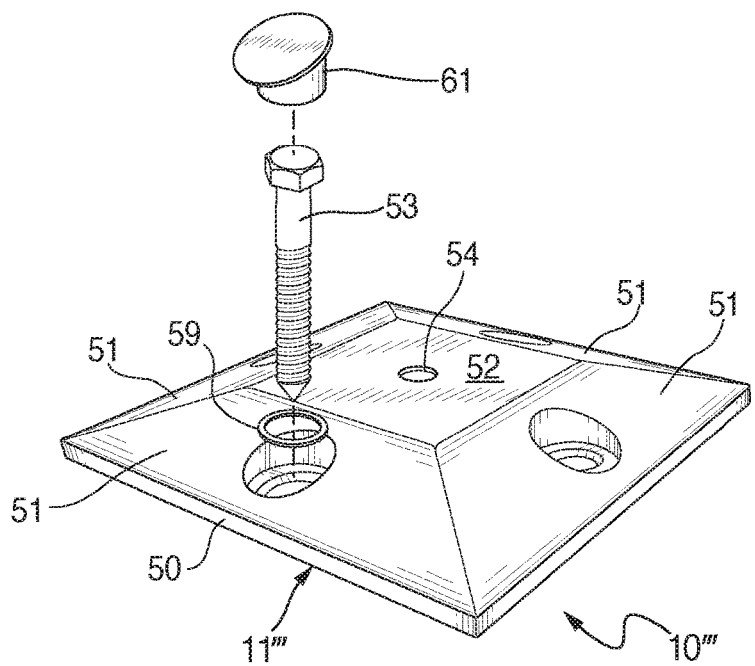
FIG. 8a is a top and side perspective view of a fourth embodiment of the anchor and railing assembly embodying the present invention, showing, in an exploded view, the employment of a cap, lag bolt and washer associated with each of the recessed throughbore cavities.
Figure 8B:
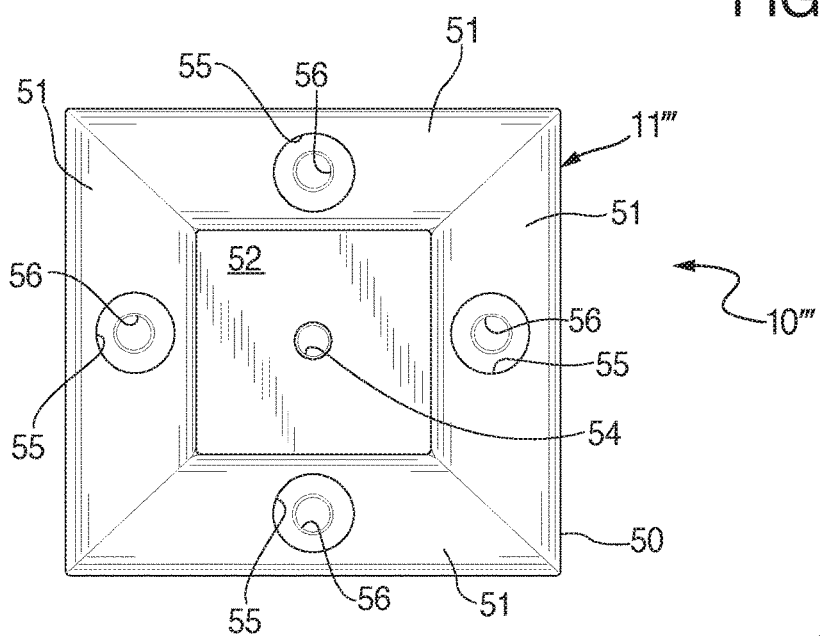
Figure 8C:
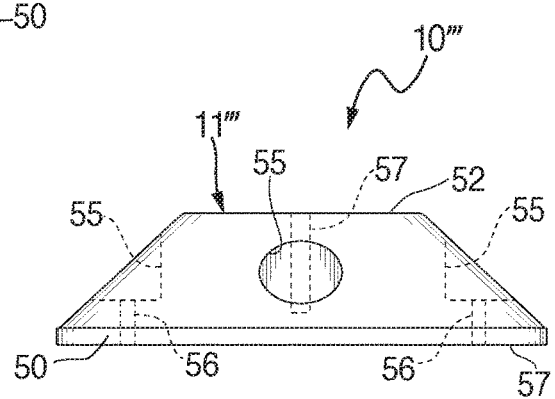
Figure 8D:
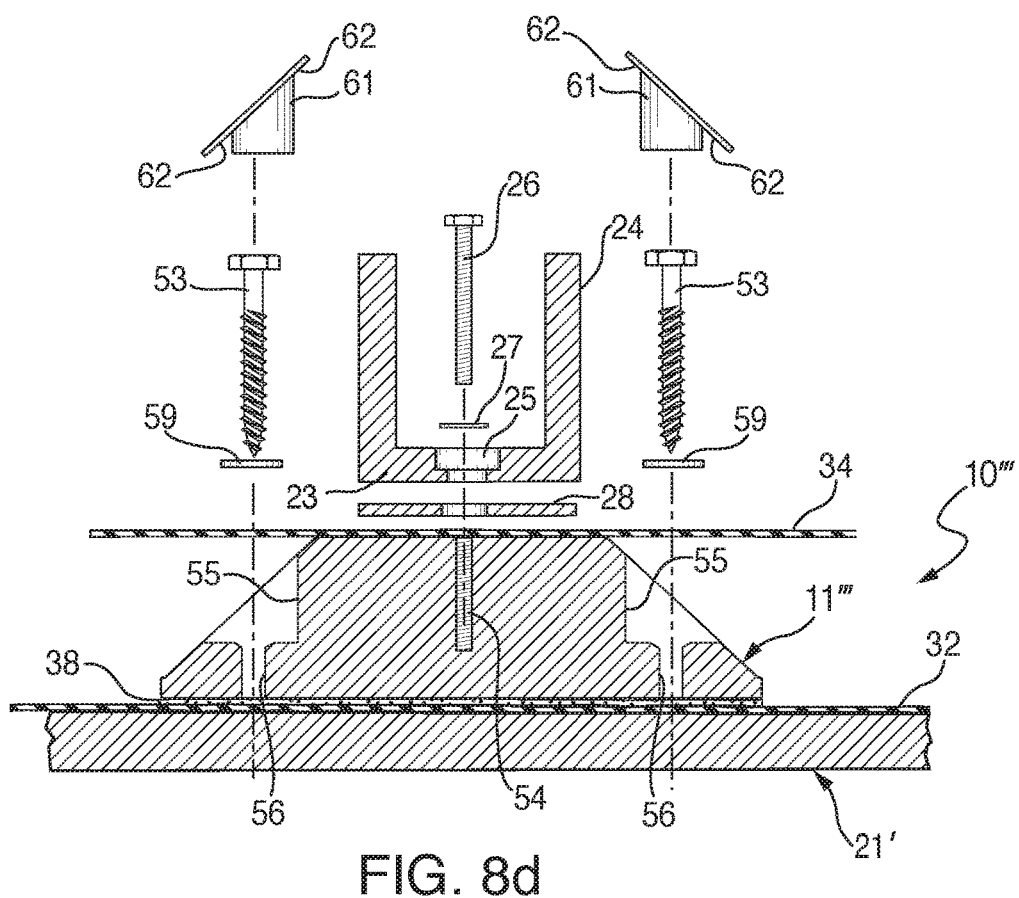
FIG. 8d is a partially-exploded, cross-sectional view of the fourth embodiment of the anchor and railing assembly.
Figure 8E:
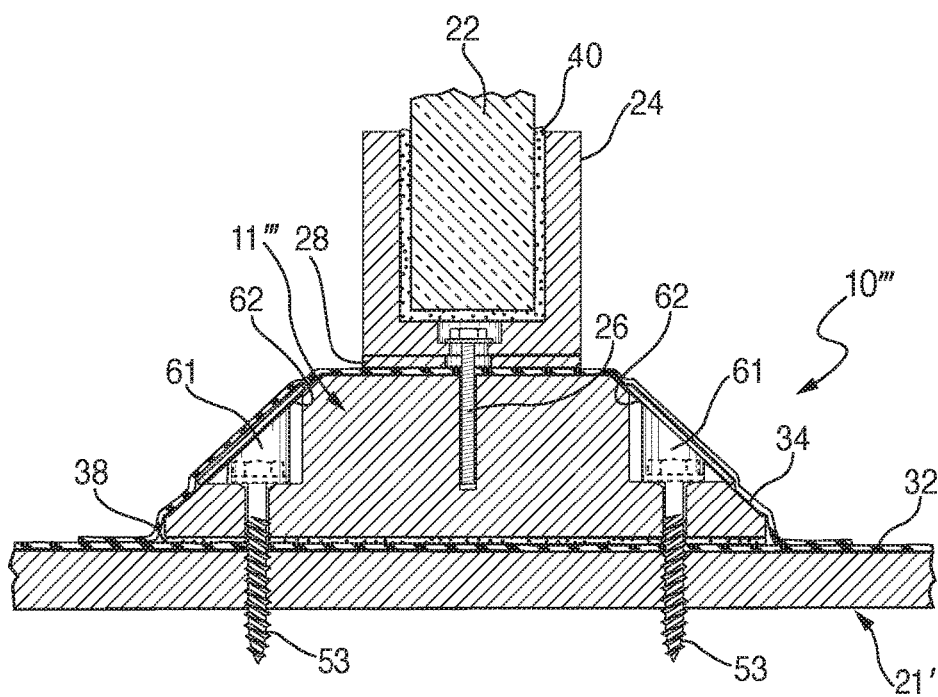
FIG. 8e is a cross-sectional view of the fourth embodiment of the anchor and railing assembly in a fully mounted state showing the anchoring of a glass railing to the anchor baseplate and further showing the use of roof flashing materials, fasteners, and adhesives employed therewith.

As seen in FIGS. 8d and 8e which respectively show an exploded cross-sectional view and a fully mounted cross-sectional view of this fourth embodiment of the anchor and railing assembly, the top wall 52 is used to anchor an object 24 to the roof structure via its internally threaded central blind bore 54. Lag screws 53 are inserted in each of the sidewall throughbores 55 to affix the anchor baseplate 11''' to the metal roof deck 21'. The sidewall cavities 55 are then covered by generally cup-shaped caps 61 having radially-extending flanges 62 which are intended to close off and seal the cavities 55 and to prevent water infiltration. Like the other embodiments, a roof membrane 32 is deployed between the anchor baseplate 11''' and the metal roof structure 21' and an anchor baseplate membrane 34 is also disposed directly over the anchor baseplate 11''' and its ends extends over the roof deck membrane 32. A bolt 26 and washer 27 is provided which anchors the U-shaped support shoe 24 to the anchor baseplate 11'''. The bolt head of bolt 26 and washer 27 are received on the throughbore step 25 of the basewall 23 and the bolt is threadably received in the threaded blind bore 54 to anchor the anchor baseplate 11''', in turn, to the metal roof deck 21'. An adhesive layer 38 also binds the anchor baseplate 11''' to the roof membrane 32 to improve the waterproofing capability of the assembly.

Figure 9A:
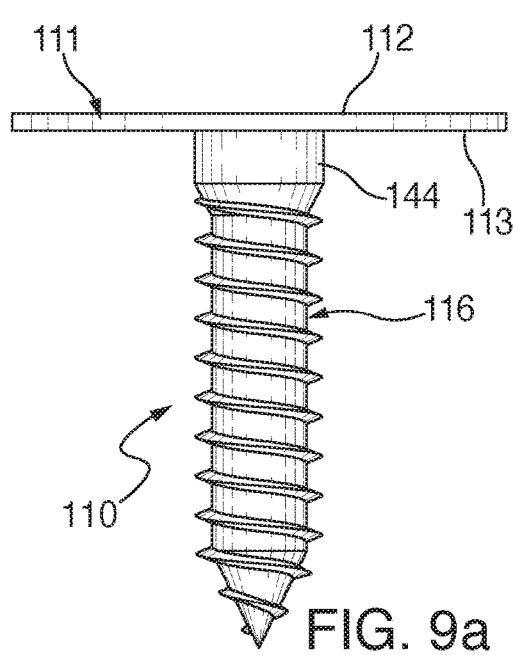
FIG. 9a is a side elevational view of a combined flush screw anchor and fastener assembly according to a fifth embodiment of the present invention.
Figure 9B:
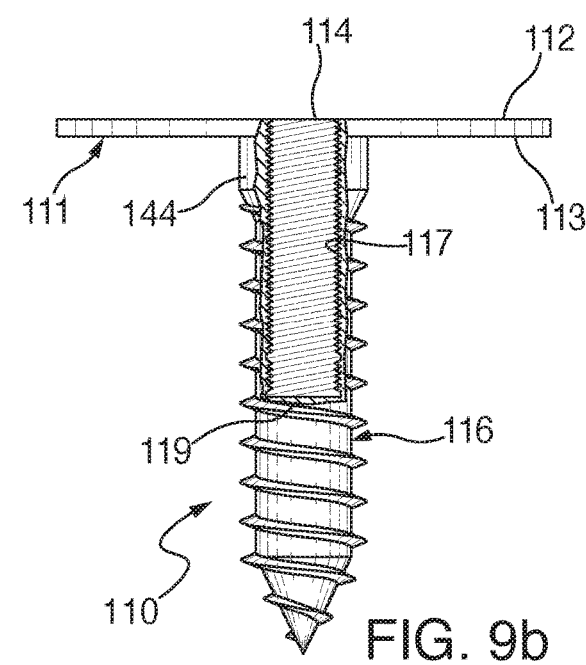
Figure 9C:
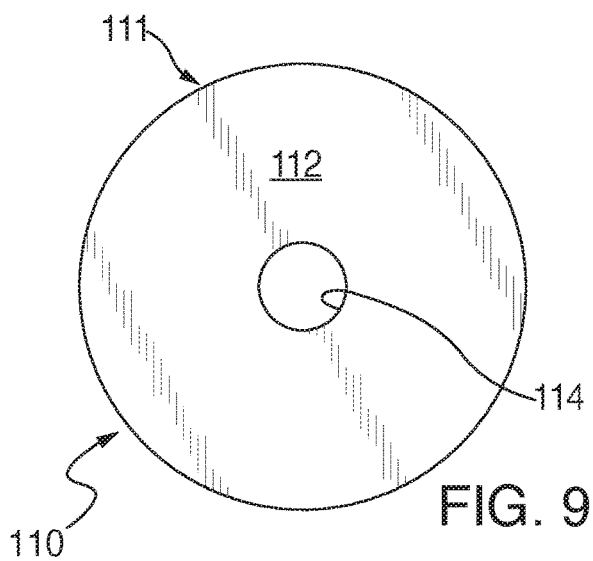
FIG. 9c is a top view of the flush screw anchor flange assembly shown in FIGS. 9a and 9b.

Turning now in particular, FIGS. 9a-9j therein illustrated are several embodiments of the novel anchor and fastener assemblies (hereinafter generally referred to as "anchors" or "anchor assemblies") according to the present invention, as shown and described in Applicant's earlier filed continuation-in-part PCT Application No. PCT/US2019/018592. As shown in FIGS. 9a-9c, anchor assembly 110 is a flush screw anchor and is particularly useful in the building trade for a myriad of uses. Flush screw anchor assembly 110 comprises a preferably planar baseplate, flange or washer 111 having an upper surface 112, an opposite lower surface 113, and an optionally-internally-threaded central opening 114 extending therethrough. Additionally, screw anchor assembly 110 also includes an externally-threaded post, preferably in the form of a screw or a lag screw 116 secured to anchor baseplate 111 and extending downwardly from lower surface 113 of baseplate 111. As shown best in FIG. 9b, the upper shaft of screw 116 includes an axially-extending, internally-threaded central bore 117 which merges with and is axially aligned with central opening 114 of baseplate 111. Bore 117 has a diameter smaller than the external diameter of the externally-threaded upper shaft of screw 116.

Bore 117 in screw 116 is a blind bore having an open top end defined by the bore 114 in flange or baseplate 111 and a closed bottom end 119 in the shaft of screw 116. It is also preferred that screw 116 and baseplate 111 are integrally joined to form a one-piece combined anchor and fastener assembly or component. Screw 116 can be secured to baseplate 111 via welding, a press-fit connection or by any other fastening means that would ensure that screw 116 and baseplate 111 are securely and rigidly fastened together to provide a strong and robust anchor.

As will be shown and discussed hereinafter in relationship to the installation and use of the anchors, of the present invention for this embodiment and the other embodiments described herein, a fastener typically in the form of a bolt 26 having an enlarged head and a threaded shaft together with a washer 27 is threadably receivable in the bore 117 to hold and securely fasten an object to the anchor so that the object, or part thereof or an associated accessory structure therefor, such as the U-shaped shoe used to support a glass panel for a roof railing as discussed previously herein and in Applicant's parent application Ser. No. 15/852,733, is securely held fast against the upper surface of anchor baseplate 111. This is accomplished preferably by providing a through-hole in the object, part or accessory structure therefor through which the threaded shaft of the bolt is passed through before it is threaded into the bore 117 or the like of the anchor and tightened to securely fasten the object to the anchor.

Figure 9D:
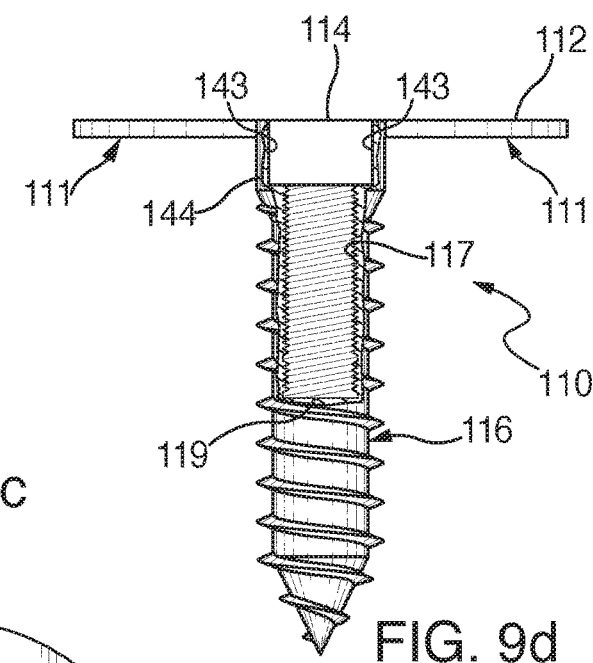
FIG. 9d is a side elevational view, in part section, of a flush screw assembly similar to FIG. 9b, but showing the optional provision of a flat head screwdriver port.
Figure 9E:
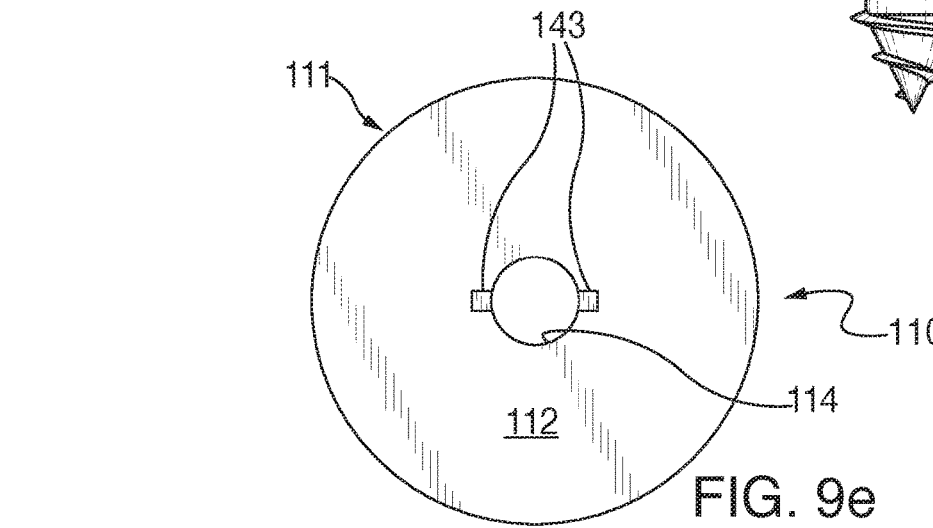
FIG. 9e is a top plan view of the flush screw anchor flange assembly shown in FIG. 9d.

FIGS. 9d and 9e illustrate a modification of the flush anchor embodiment shown in FIGS. 9a-9c, wherein a recessed, flat head screw slot or port 143 is formed in baseplate 111 on opposite sides of its central bore 114 which extends therebelow into the upper, externally smooth and enlarged head portion 144 of lag screw flush anchor 110' on opposite sides of its central bore 117 to allow a flat head screwdriver or other tool (not shown) to be inserted into said slot 143 to facilitate turning of the externally-threaded shaft of screw 116 to either screw the anchor 110' into the intended supporting structure or to threadably remove it therefrom, if e.g., it needs to be repositioned in the building supporting structure.

FIGS. 9f and 9g illustrate another modification of the screw anchor assembly shown in FIGS. 9a-9c, wherein instead of the employment of a flat head screwdriver port 143, an Allen key port 145 is provided. More particularly, a countersunk hexagonal head space is provided above the top end of the blind bore 117 in the upper, externally smooth enlarged head portion 144 of lag screw anchor 110 extending downwardly from the top surface 112 of washer 111. The enlarged cylindrical head portion 144 of lag screw anchor 110 has a hexagonal inner wall surface 146 defining Allen key port 145. The Allen key port 145 is designed to receive an Allen key (not shown) by which the flush screw anchor 110 can be easily and threadably screwed into, and removed from the support structure, as described and illustrated in greater detail hereinafter.

In yet another embodiment of the screw anchor assembly of the present invention, as shown in FIGS. 9h-9j, a hex head lag screw anchor 210 is provided having a hexagonal hex nut 250 secured atop upper surface 212 of baseplate 211. The hexagonal hex nut 250 serves the same purpose as the screwdriver slot, Allen key port, or the like, whereby a tool such as a socket wrench (not shown) can be used which is configured to grip the hex head to facilitate its threaded engagement into, or removed from the support surface. External hex nut 250 is preferably integrally joined to baseplate 211, such as by welding, to form a one-piece component. As shown best in FIG. 9i, external hex nut 250 contains an internally-threaded, central through bore 252 which is in axial alignment and registering with central bore 217 of lag screw 216 and bore 214 of baseplate 211. While anchor 210 is illustrated and described as having a hexagonal shaped nut 250, other polygonal or geometric shapes are possible and contemplated by the present invention and as further disclosed below.

FIGS. 10a-10k illustrate several different and preferred arrangements where an inventive anchor assembly is utilized in combination with a baluster or post assembly to securely attach the baluster to a base support or other structure for both outdoor (e.g., roof or terrace) and indoor (e.g., staircase or balcony) applications, that avoid problems associated with conventional baluster attachments, (e.g., like waterproofing anchoring, and/or fastening problems). The arrangement provides an ability to simply install a standard baluster. As importantly, the inventive arrangement provides for the ability to install a radius post (i.e., round post) as easy as the standard post (i.e., square post). As is known, conventionally attaching a radius post to a base support or other a structure to which the post should be mounted, such as a roof structure, is very difficult because a round piece of wood (or a synthetic post) cannot sit plum to a flat beam. For that matter, it is very difficult to waterproof both round and standard posts installed conventionally, where the arrangement must be waterproof. One way to flash a radius post requires a custom radius copper soldered flashing but it is quite vulnerable to leaks. On the other hand, using the inventive anchor assembly allows for radius or round posts to be installed upon a structure, such as a roof structure, deck or stairs the same way as standard or square installations.

Figure 10A:
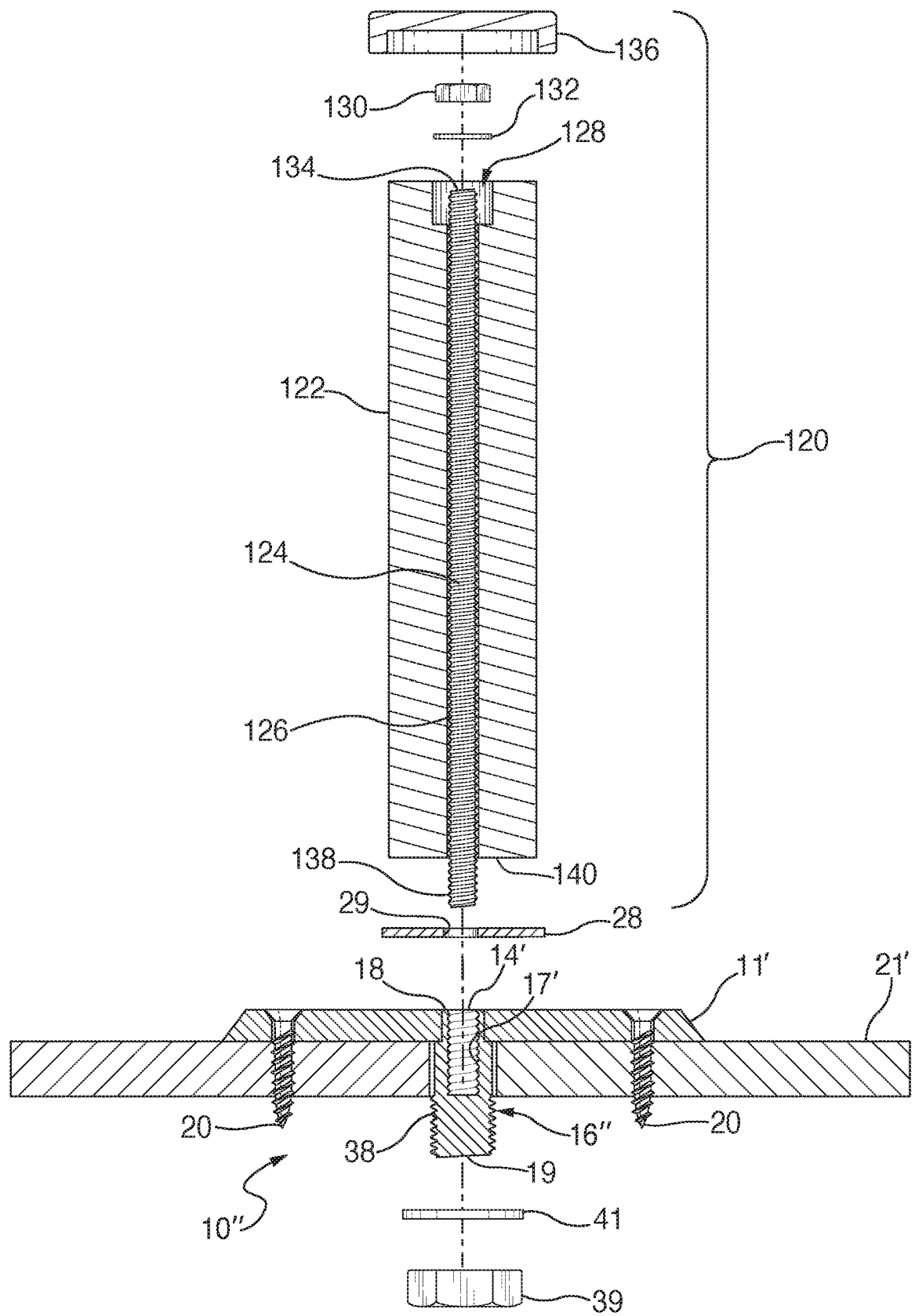
FIG. 10a is a partially-exploded, cross-sectional view of a seventh embodiment of the present invention wherein an anchor and railing assembly having an anchor baseplate with a partially-threaded, externally-threaded lower center post having a blind bore which is utilized to support a wood baluster intended for both outdoor and indoor applications.

As shown in the embodiment of FIG. 10a, the anchor 10'" shown in FIGS. 6a and 6b is illustrated. It has an anchor baseplate 11' with an internally-threaded central through bore 14' and an at least partially, externally-threaded cylindrical rod or post 16" having an axially-extending, internally-threaded blind bore 17', having a reduced neck top open end 18 and a closed bottom 19, which is secured preferably via welding to the anchor baseplate 11' so that the top open end 18 of its bore 17' abuts and is in registry with the top open end of center throughbore 14'. As shown, the externally-threaded cylindrical post 16" extends through the roof deck 21' and projects below the roof deck with its closed end 19. Anchor baseplate 11' is fastened to support 21' by screws 20. Nut 39 and washer 41 are received on the externally threaded lower end 37 of post 16" to securely fasten a baluster or post assembly generally designated 120 to anchor baseplate 11' and, in turn, to support 21 (e.g., roof deck).

As mentioned above, this embodiment is particularly suited for arrangements that should be waterproof, such as a roof deck, but the invention is not limited thereto. Although not shown, flashing materials as explained in FIGS. 6a and 6b would typically be applied in both this embodiment (FIG. 10a) as well as the following illustrated embodiments.

Figure 10B:
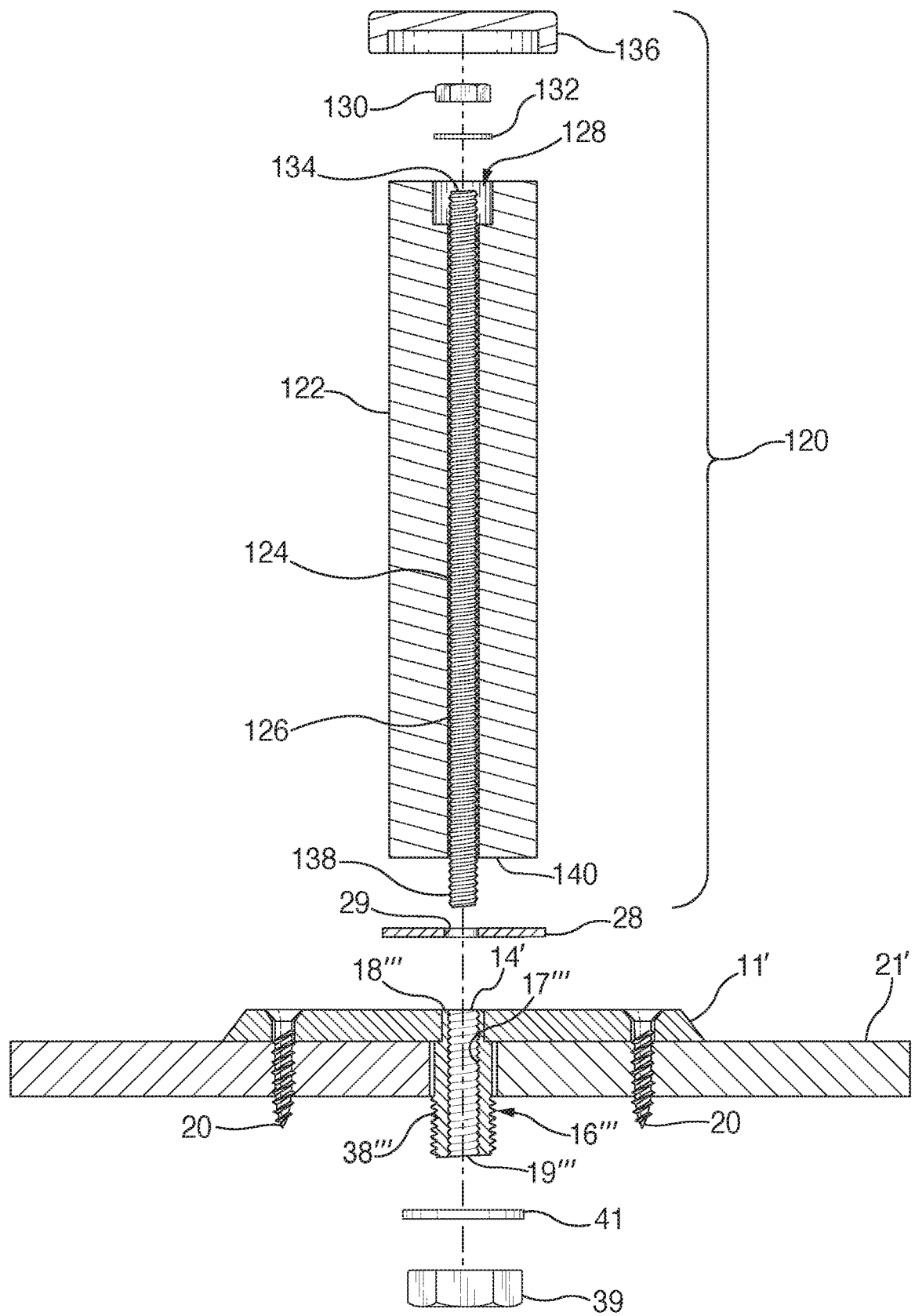
FIG. 10b is a partially-exploded, cross-sectional view of a further embodiment of the invention which is similar to FIG. 10a except that the anchor baseplate has a post depending therefrom having a throughbore rather than a blind bore which arrangement is especially intended for indoor applications.

On the other hand, as shown in FIG. 10b, the threaded bore 17'" in cylindrical post 16'" has an open bottom 19'" in addition to its open top end 18'" to define a throughbore 17'" rather than a blind bore 17', as shown in FIG. 10a, where water penetration is not an issue, such as when the parts are used indoors, such as for posts, newels and balusters for floors or an indoor staircase, open balcony or for mounting in concrete floors.

Regardless of the embodiment shown, the internally-threaded and aligned anchor baseplate and post bores serve as an anchor point for anchoring baluster or post assembly 120. Baluster or post assembly 120 includes a baluster 122 (sometimes referred to in the building trade as a spindle, pillar, or picket), which may comprise wood, such as mahogany, cedar, pine, etc., metal or synthetic material such as plastics or other composites. And while the post 122 is shown to be square shaped, it is not limited thereto but may be any known geometry such as round, triangular, square, pentagonal, hexagonal, flat, etc., without limitation. As shown, post 122 optionally includes a threaded metal rod 124, which is installed in a preferably centrally-located throughbore 126. The threaded rod 124 as shown is preferably a ½ inch threaded rod but may be larger or smaller to fit the immediate application, or to accommodate the diameter of the threaded and aligned bores of the anchor and post assembly.

A top portion 128 of the post 122 is preferably recessed in its center to accommodate a nut 130 and washer 132 for attachment to the top end 134 of the threaded rod 124. Also, an optional post cap 136 may be arranged to cover the top portion 128 of the post, once the nut 130 and washer 132 are attached to top end 134 of the threaded rod 124. As can be appreciated, alternatively a top rail 360 (see FIG. 7d) may be employed, in which case it would have an extended length to cover the top portions of multiple spaced-apart balusters or posts 120. A bottom end 138 of the threaded rod 124, which extends out from a bottom portion 140 of the post 124, is threaded into the internally threaded and aligned bores 14, 14' and 17, 17', 17'" to anchor the post attachment 120 to the anchor baseplate 11, 11' and therefore, to the support structure 21. Here too, the assembly means include an optional square-shaped shim plate 28 having a central throughbore 29 mounted atop the anchor baseplate 11, 11'. Accordingly, the shim plate's central throughbore 29 is directly over and in registry with the internal bore 17, 17', 17'" of the cylindrical post 16, 16', 16'", independent of whether the bore 17, 17', 17'" is a blind bore 17, 17' for waterproof applications, (FIGS. 10a, 10c-10f) or a throughbore 17'" where waterproofing is not required, (FIG. 10b). The shim plate 28 is used to adjust the height of the post 122.

In the embodiments shown in FIGS. 10a, 10b and 10e, a nut 39 and washer 41 are attached to the externally-threaded portion 38, 38'" of the cylindrical post 16, 16" with its lower end 19, 19'" extending through and below the structure 21', as opposed to the smooth cylindrical post 16, 16' of FIGS. 10c and 10d. This way, in the fully assembled state, the nut 39 and washer 41 are tightened against the lower surface of the structure 21' to provide a stronger point of attachment while at the same time preventing leaks at the point of attachment via the blind bore 17, 17' and the closed end 19 of the cylindrical post 16, 16' (again, in an arrangement where waterproofing is required). The use of the anchor and railing assembly avoids having to pass the post attachment through the structure for attachment to beams or rafters thereunder, and sealing the post attachment 120 against water using conventional means, particularly when the post attachment is not a standard square or rectangular shape (e.g., a radius post).

Figure 10C:
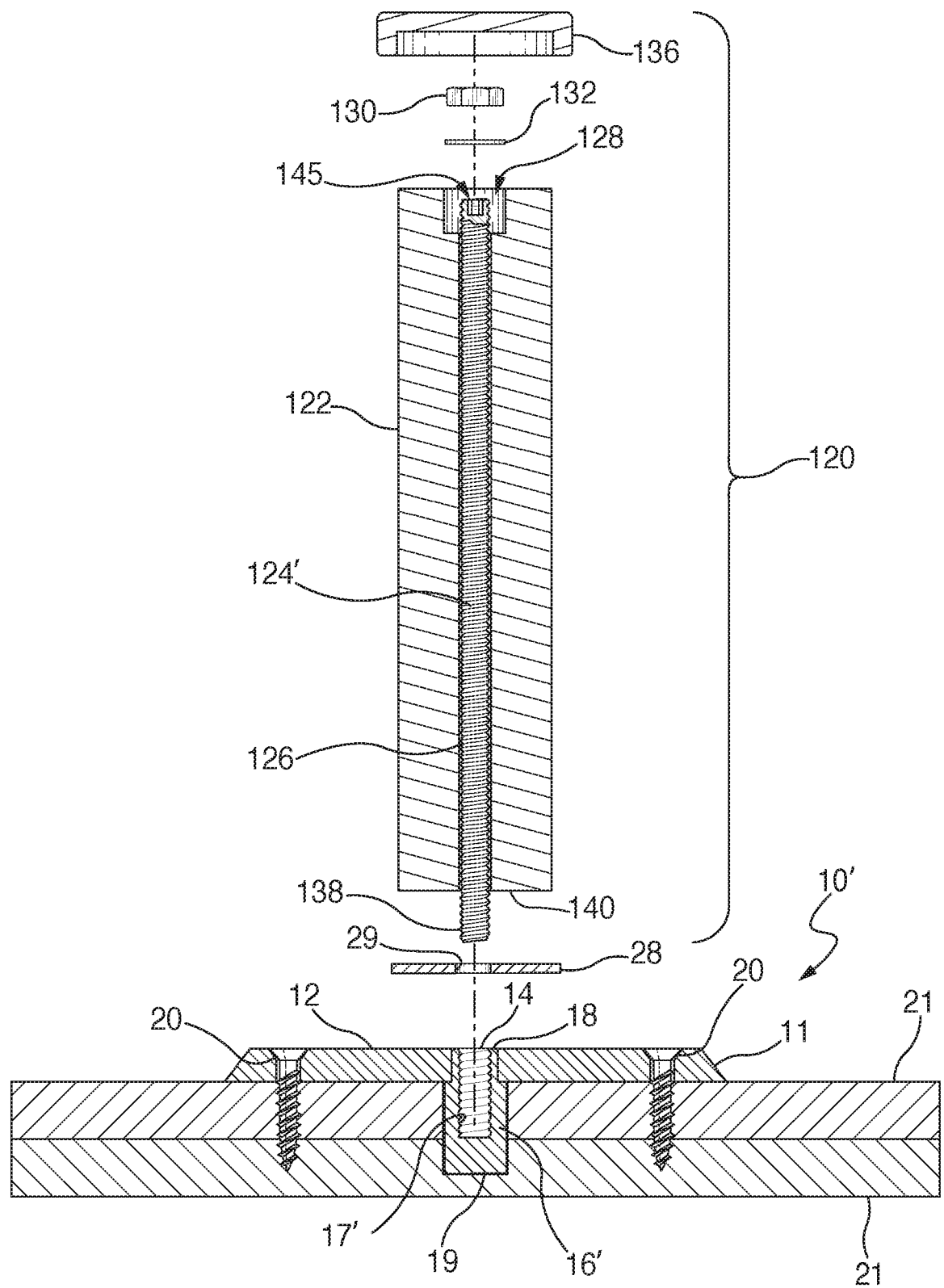
FIG. 10c is a partially-exploded, cross-sectional view, of a further embodiment of the invention which is similar to FIG. 10a except that the baluster is provided with an axially-arranged, centrally-disposed threaded rod having an Allen key port formed in its top end and the anchor baseplate post has a smooth external surface and is mounted within a cup-shaped cavity formed in the two ply wood deck.

FIG. 10c illustrates an embodiment similar to FIG. 10a except that the anchor baseplate 11' has a smooth cylindrical post 16' with a blind bore 17' and a metal rod 124' having a conventional Allen key port 145 recessed in its top end and the supporting structure comprises a two-ply wood deck 21', 21' in which the cylindrical post 16' is embedded with the anchor baseplate 11' lying atop the deck 21 and coupled thereto via screws 20 extending into its bottom ply 21. As heretofore described, Allen key port 145 has polygonal sidewalls to allow for engagement of an Allen key therein having a bit of a similar configuration to allow for easy and facile turning and tightening of threaded rod 124' into threaded bore 17'.

Figure 10D:
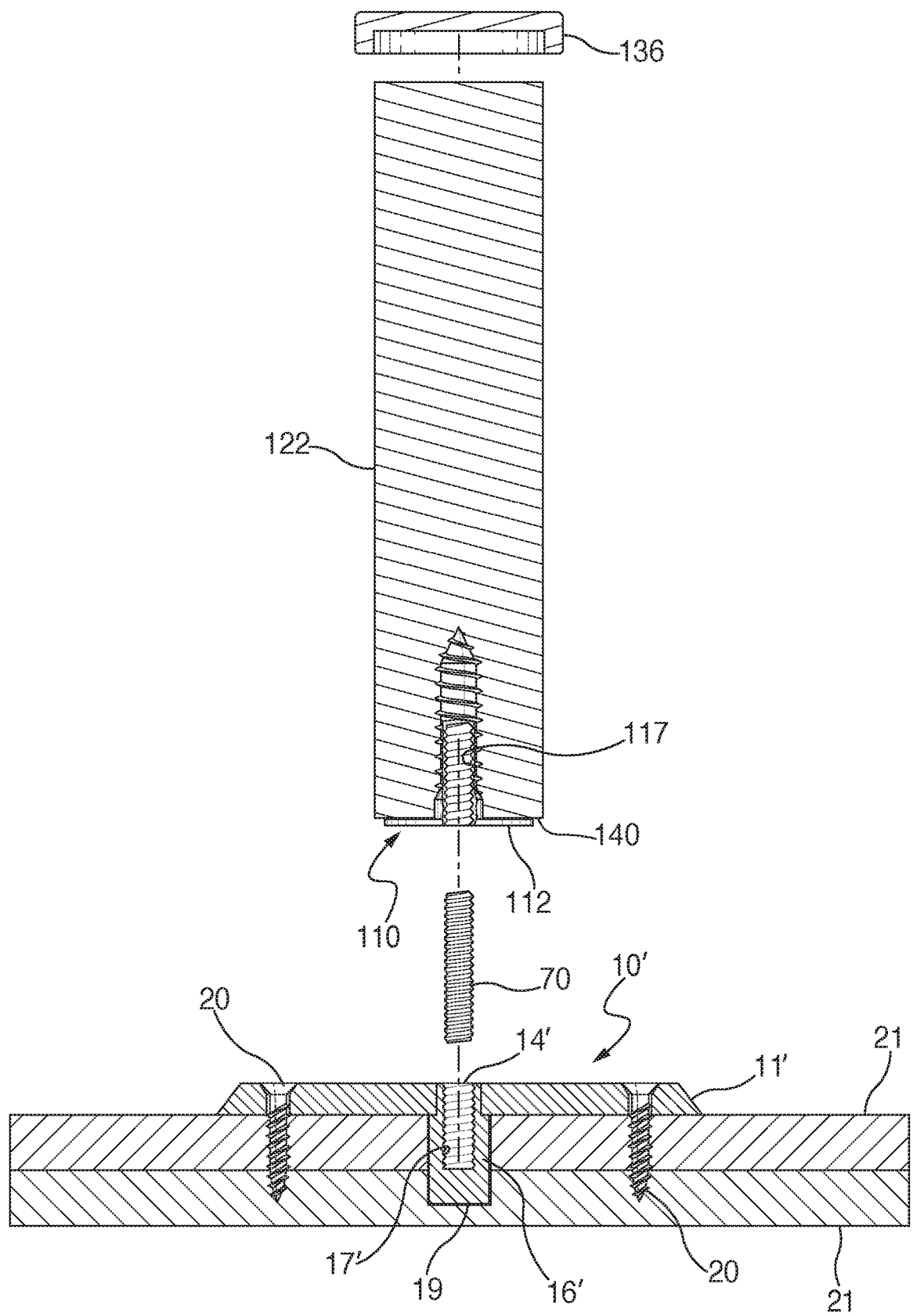
FIG. 10d is a partially-exploded, cross-sectional view of a further embodiment of the invention which is similar to FIG. 10a except that the baluster is provided with an axially-arranged flush screw anchor of the type shown in FIG. 9a threadably received in the bottom end thereof and an anchor baseplate post which has a smooth external surface which is mounted within a cup-shaped cavity formed in the two ply wood deck.

FIG. 10d illustrates a further embodiment which is similar to FIG. 10c except that an anchor baseplate, especially the flush screw anchor version of FIG. 9a is used for providing a baluster 122 with an internally threaded bore 117 at its bottom end 140. Thus, rather than providing the baluster 122 with threaded blind bores, a flush screw anchor 110 could be screwed into the top and/or bottom end of the baluster such that its flange would lie flush against one or both of the ends thereof. The threaded blind bore 117 of the screw anchor 110 would then serve as the threaded internal bore of the baluster. In this embodiment, the top end of the threaded rod 70 is partially receivable in the blind bore 117 of screw flush anchor 110 affixed to the bottom end 140 of baluster 122 and its lower portion is receivable in the blind bore 17' of anchor baseplate 11' to secure the baluster bottom end 140 flush against the top surface 12' of anchor baseplate 11'.

Figure 10E:
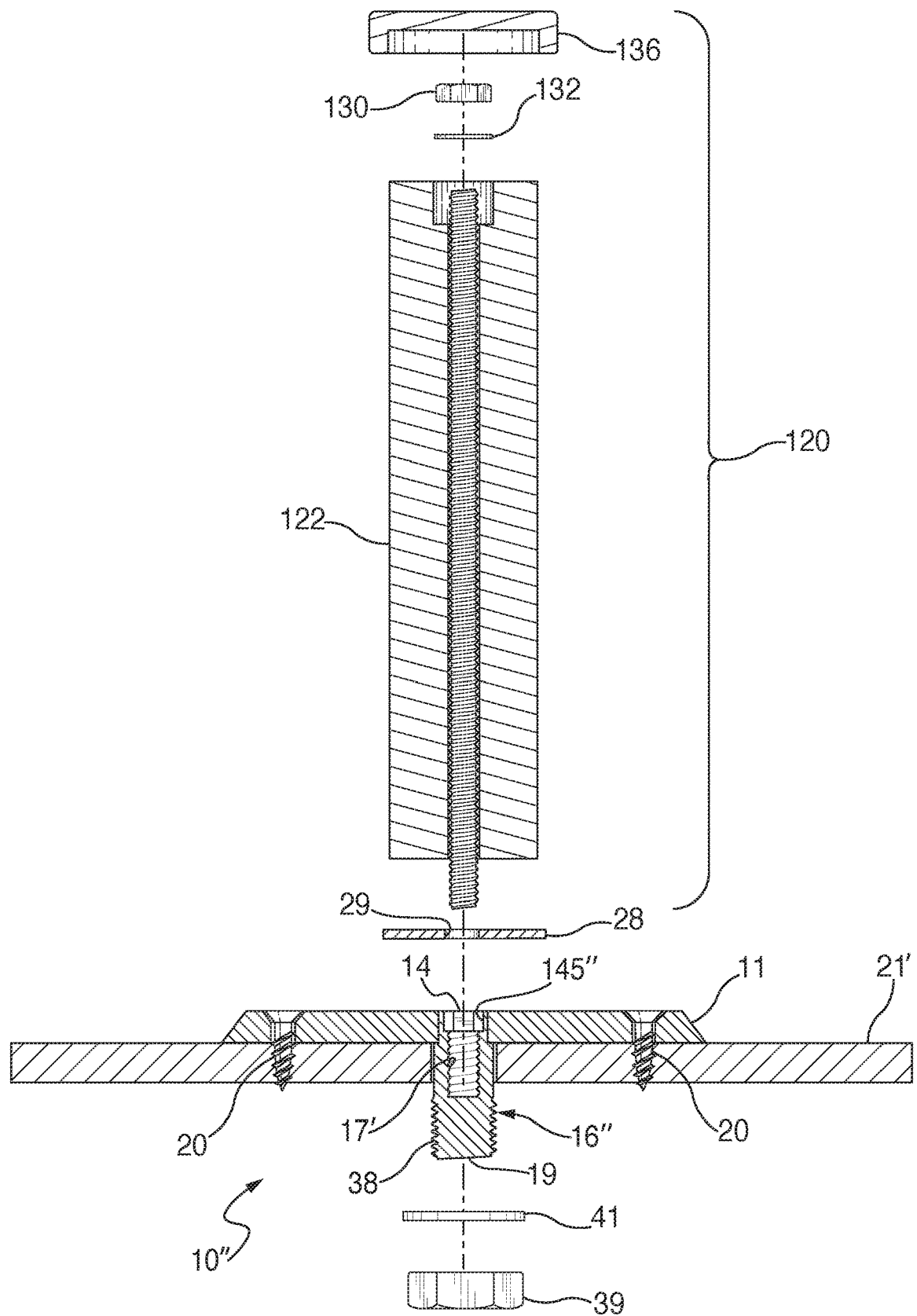
FIG. 10e is a partially-exploded, cross-sectional view of a further embodiment of the invention which is similar to FIGS. 10c and 10d except that the Allen key port is provided in the anchor baseplate blind bore instead of the baluster and the supporting structure is a metal panel.

FIG. 10e is a further embodiment of the invention comparable to FIGS. 10c and 10d except that the Allen key port 145' is provided in the anchor baseplate blind bore instead of the baluster and the supporting structure 21' is a metal panel.

Figure 10F:
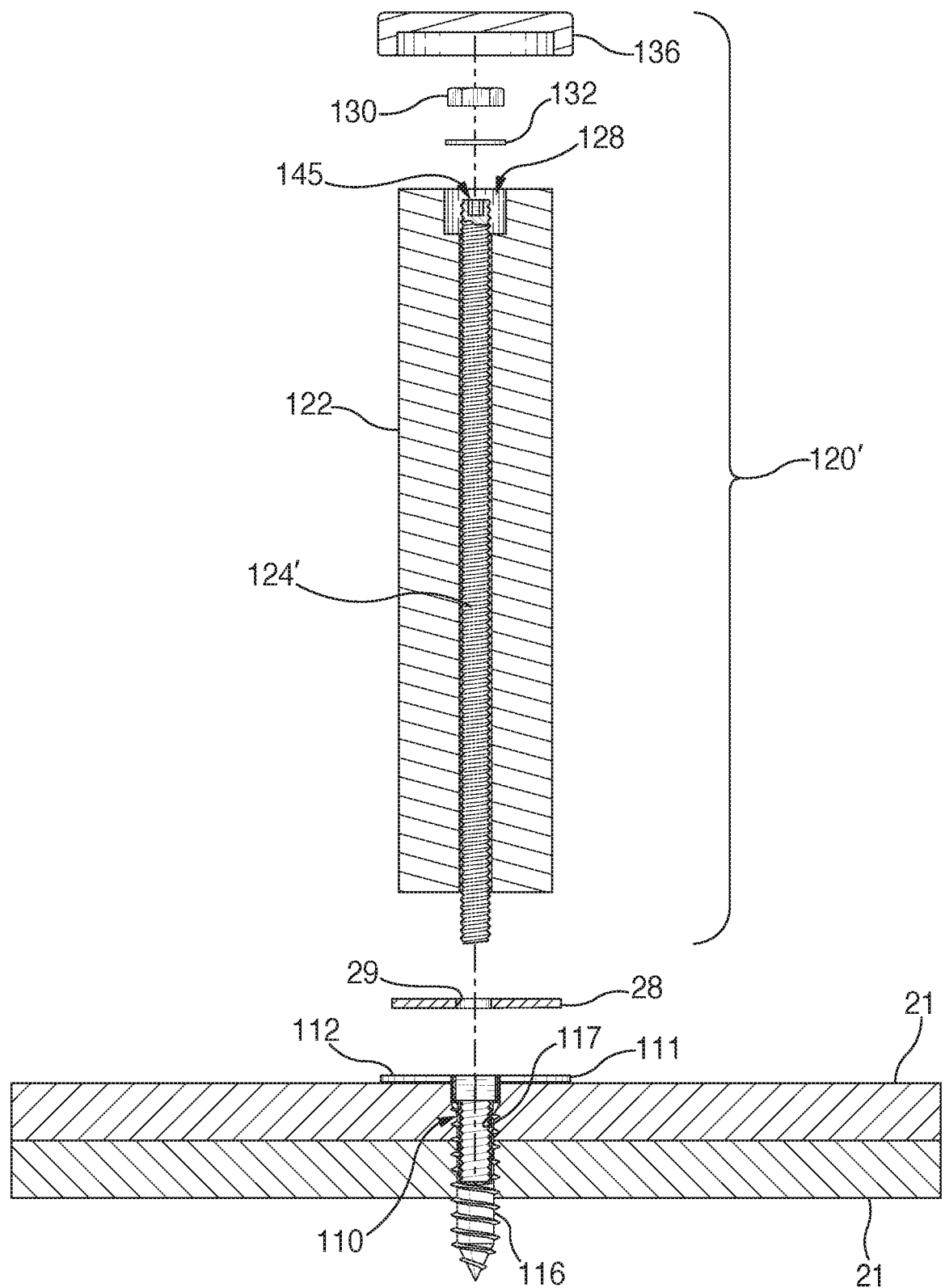
FIG. 10f is a partially-exploded, cross-sectional view of a further embodiment of the invention comparable to FIGS. 10c and 10b, but showing the employment of a hollow metal baluster instead of a wood baluster.
Figure 10G:
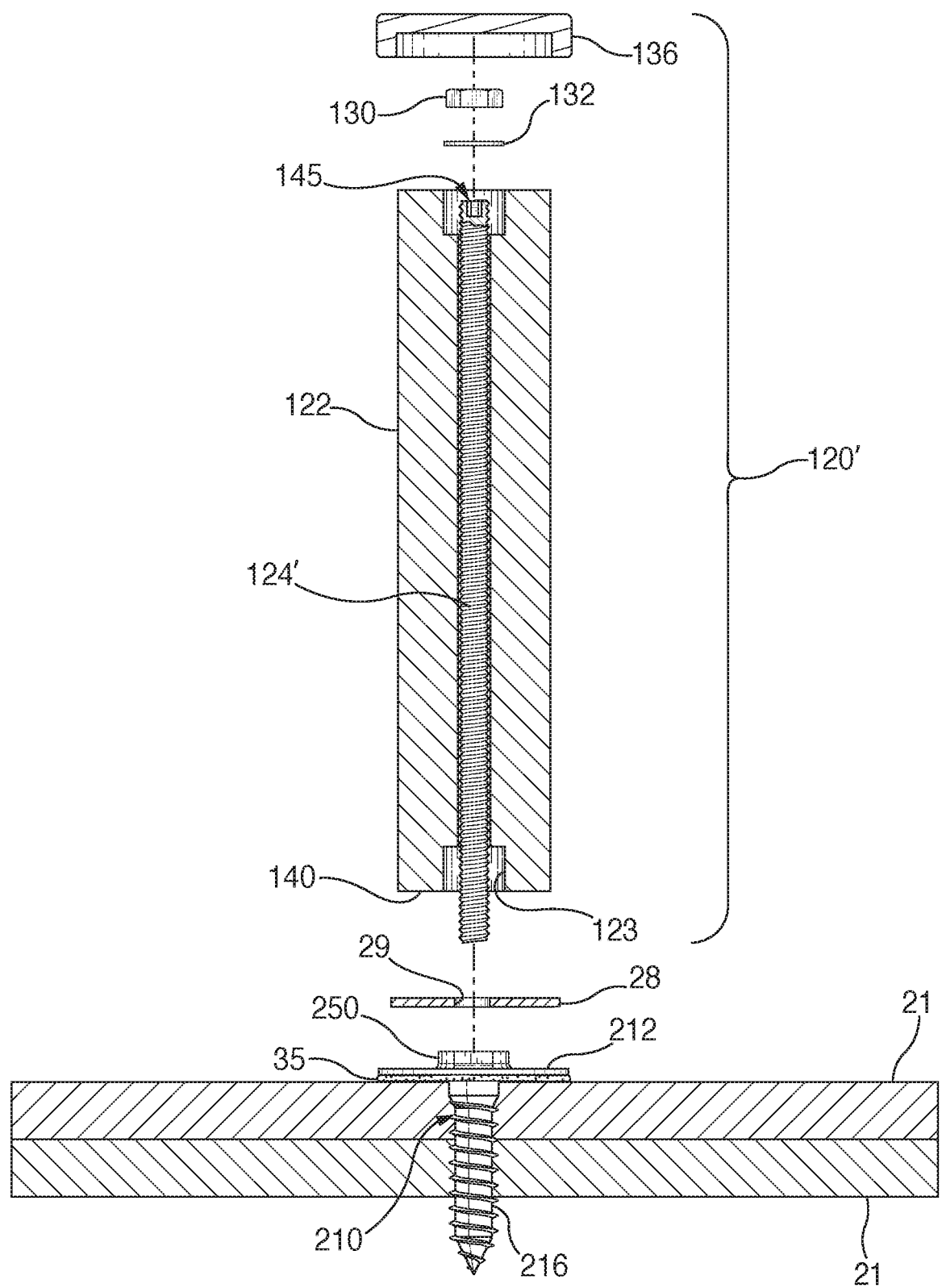
FIG. 10g is a partially-exploded, cross-sectional view similar to FIG. 10i except for the use of a different version of the metal baluster.
Figure 10H:
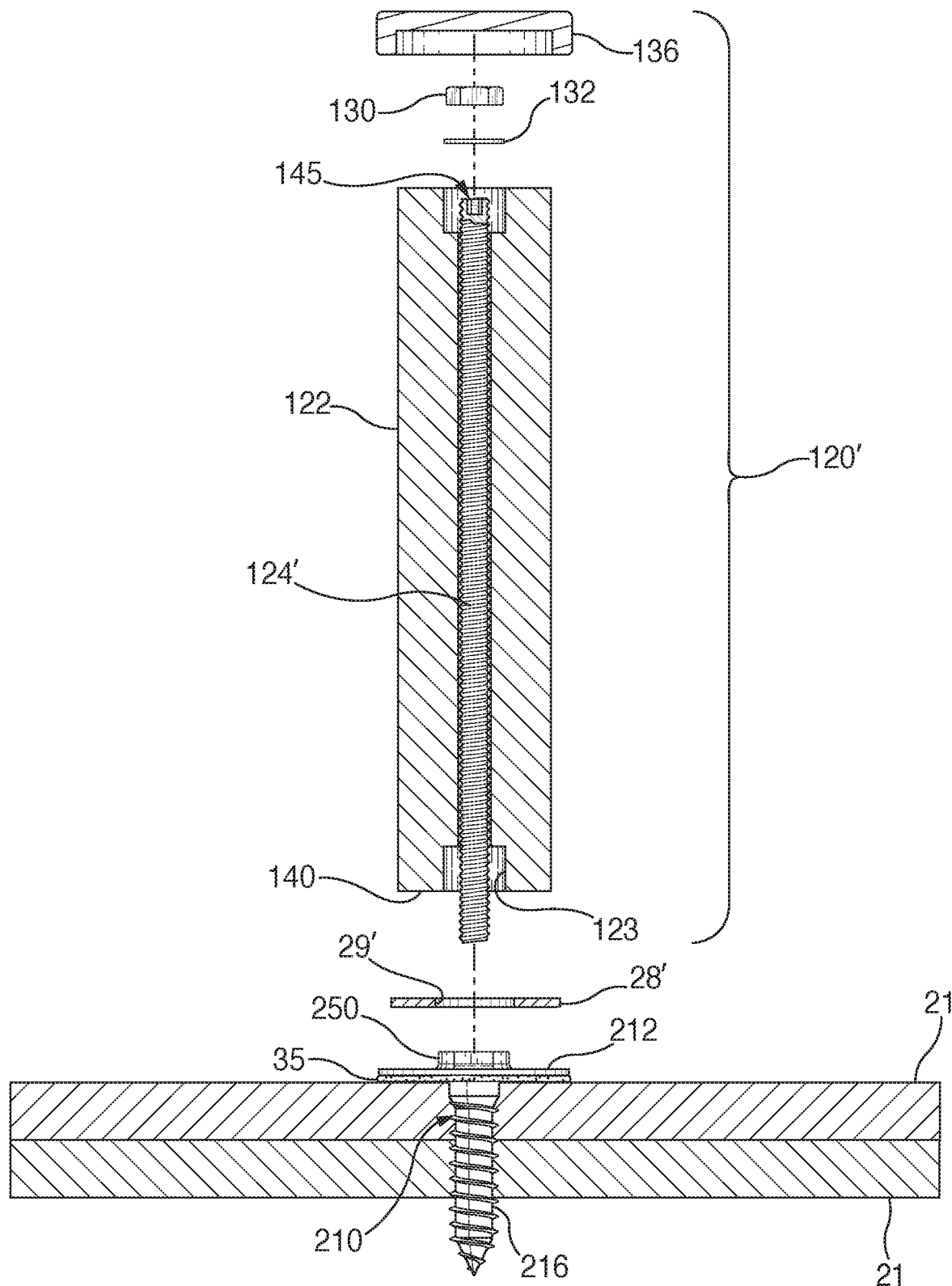
FIG. 10h is a partially-exploded, cross-sectional view similar to FIG. 10c except that a flanged screw anchor of the type shown in FIG. 9a is employed in place of the anchor baseplate and post assembly.

FIGS. 10f, 10g, and 10h show alternative methods for supporting a post 122 utilizing the screw anchors shown in FIGS. 9a-9j. As shown in FIG. 10f, the screw anchor 110 of FIG. 9f is employed to support the post 120. On the other hand, FIGS. 10g and 10h employ the hex-head screw anchor 210 of FIGS. 9h-9j. Washer 28 is optionally used in a similar manner to the washer 28 shown in FIGS. 10a-10e wherein when fully mounted it abuts the bottom 140 of the post 122. As a result, in FIG. 10g the bottom 140 of the post would, in turn, abut the top of the raised hexagonal head 250 and be spaced above the anchor baseplate or flange 211 a distance equal to the height of the head 250. This creates a greater separation of the post 122 and support 21 to prevent any water on the support 21 from wicking into the post. On the other hand, as shown in FIG. 10h a washer 28' has a center hole 29' which has a diameter slightly greater than the width of the raised hex nut head 250 and a height equivalent to the height of hex nut head 250 so that it will fit in the central recess 29' of washer 28' effecting transforming the hex screw anchor into a flush screw anchor so that the bottom end 140 of post 122 will abut the top of flange 211 which, in, turn, lies essentially flush against support 21. Optionally, baseplate 211 may have a sealant layer 35 on its bottom surface 213.

Figure 10I:
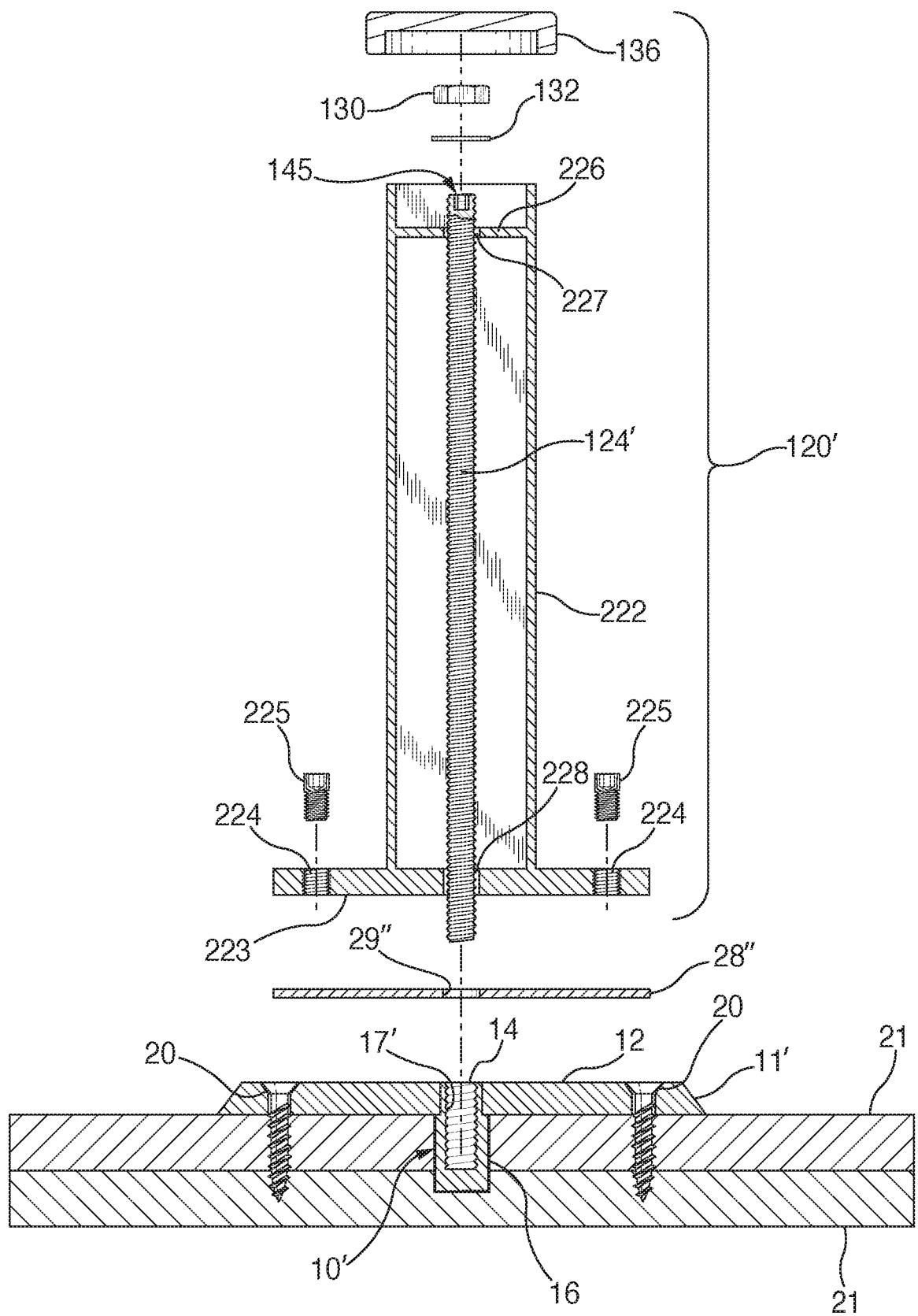
FIG. 10i is a partially-exploded, cross-sectional view similar to FIG. 10h, except that a hex-head flanged screw anchor of the type shown in FIG. 9h is employed.
Figure 10J:
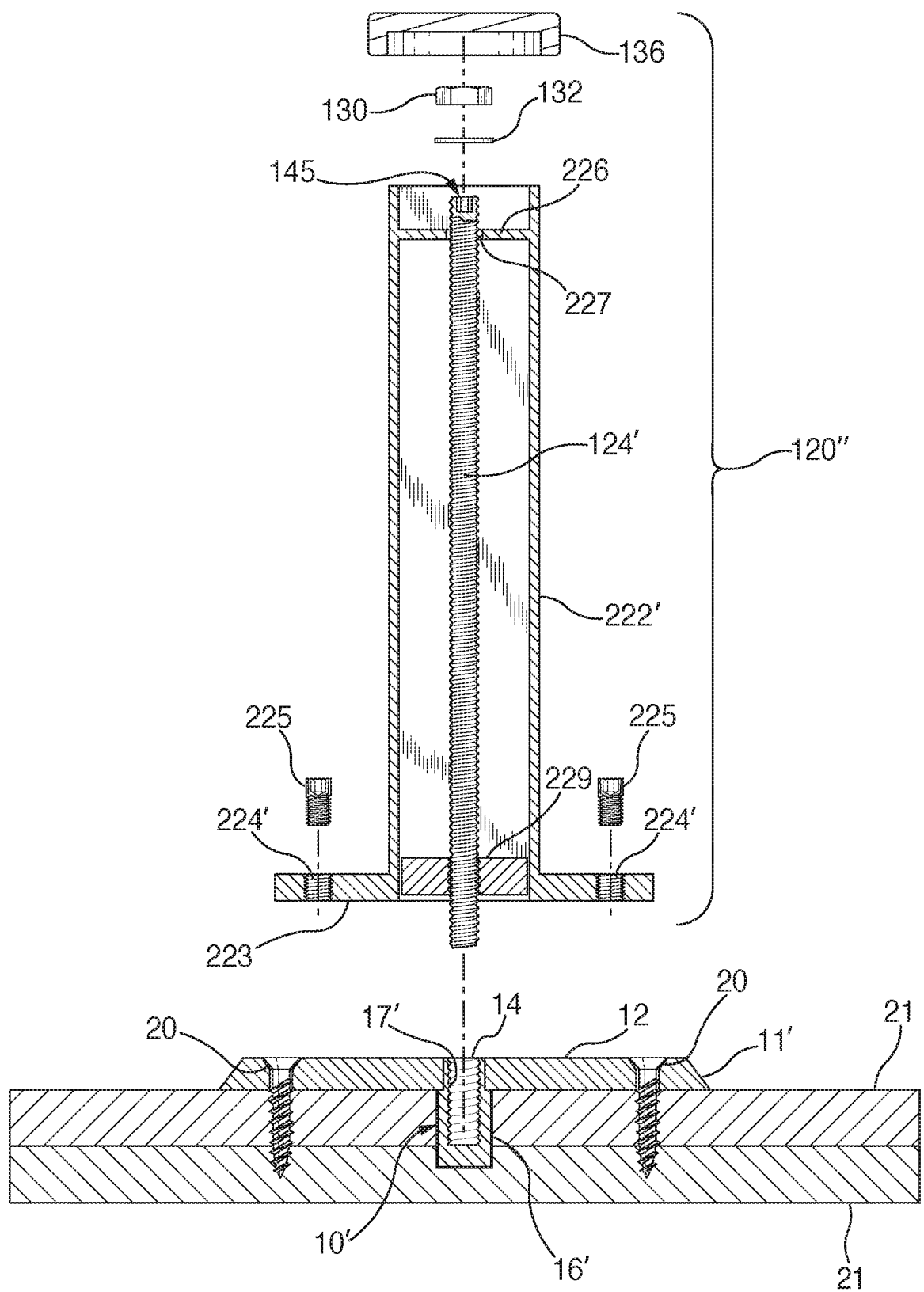
FIG. 10j is a partially-exploded, cross-sectional view similar to FIG. 10i except that a modified washer is employed which is receivable over the hex-shaped head of the screw anchor.

FIGS. 10i and 10j show two further embodiments wherein a steel post 120' is provided instead of a wood post 120, but which has a generally comparable structure and utilizes the same anchor and fastening system of the present invention. However, in these two embodiments the post 124' comprises a steel, hollow square-shaped tubular baluster or post 222 which in FIG. 10i houses an inner threaded metal rod 124', the upper end of which has an Allen key port 145 formed thereto to facilitate rotation of its bottom end into the blind bore 17' of the post 16' of the anchor 10'. Adjacent the top end of the rod 124, a horizontal guide member 226 is affixed, by welding, to the tubular post 222 which has a central bore 227, through which the rod 124' passes with some clearance to allow it to be rotated via Allen key port 145. The rod 124' is supported by washer 132 and nut 130 which is fully tightened after the post 120' is threaded into anchor 11'.

At the bottom of the post 222, a transverse base member 223 is provided to which the bottom of the tubular post 222 is affixed which also has a central opening 228 through which rod 124' also passes with clearance to allow it to be rotated via Allen key port 145. The bottom plate 223 is intended to sit atop the top surface 12 of the anchor baseplate 11' although an optional washer or shim plate 28 having a central hole 29 can be inserted therebetween. The bottom plate 223 has a plurality of spaced-apart, threaded through holes 224 formed therethrough in which set screws 225 can be threadably adjusted to level the post 120', as needed.

As shown in FIG. 10j, the steel post 120" is generally the same as the post 120 shown in FIG. 10i except for a modified base member 224' which is disposed outwardly of the post 122' adjacent to its bottom end and is therefore not itself used to center the rod 124'. Instead a spacer plate or disc 229 is fixedly mounted on the threaded rod 124' adjacent to its bottom end which is dimensioned to have a width less than the inside wall of post 222' so as to provide clearance between it and the inner walls of the post 222' to allow the rod 124' to be rotated and secured to the anchor baseplate 11' as previously described.

Figure 10K:
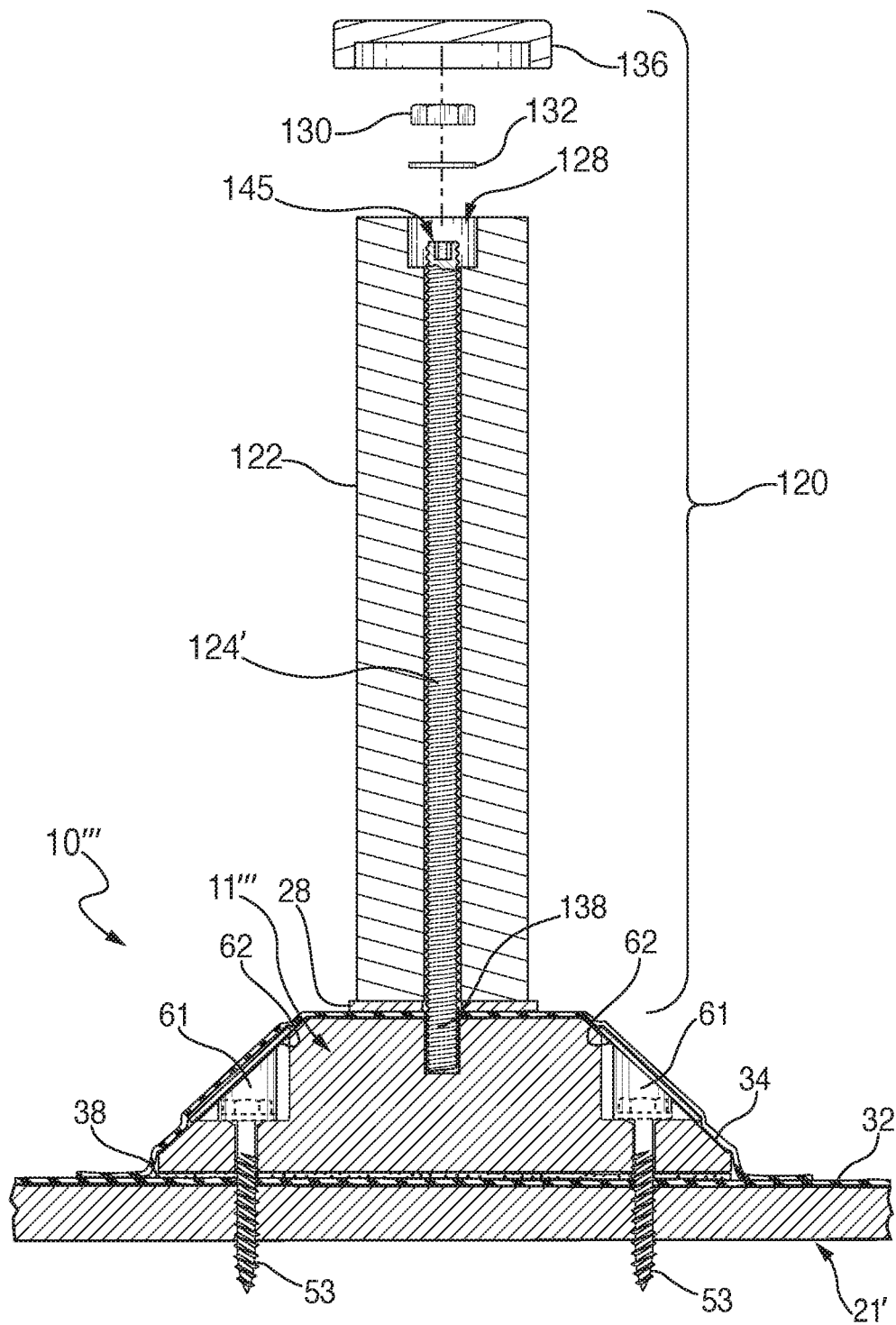
FIG. 10k is a cross-sectional view of a further embodiment showing the anchor and railing assembly of the type shown in FIG. 8e being used to support a baluster of the type shown in FIG. 10c.

FIG. 10k depicts an embodiment that has a baluster or post 120 which is the same as shown in FIG. 10c. However, it is supported by the pyramidal anchor baseplate of FIGS. 8a-8e wherein the lower threaded end 138 of the post 120 is threadably received in the threaded blind bore 54 of the anchor baseplate 111'.

For safety reasons, it may be prudent to connect, or interconnect, posts through the use of one or more midrail cables running laterally through the respective spaced-apart posts. To do so, the baluster or post assembly is configured with openings or ports to pass midrails made of wire cables, from one post to another, or to connect to some other building support structure, such as an adjacent building wall, once the anchor and railing assembly and post attachment are secured to the support structure. The cable or cables, once installed, passed through ports arranged in the posts, operate as a safety fence. Additionally, the inventive post may be configured to allow a cable to pass through its entire longitudinal length, as a full-length pass through. In this way, a cable may be passed through the entire length of the post, starting at a port at the top and through a port at the bottom, to securely affix the post or to additionally serve the purpose of acting as an electrical conduit for electric wires or lights to light the structure or portions thereof or possibly even serve as a fluid conduit to heat the balusters or the top hand rail thereof.

FIGS. 11a, 11b, 11c and 11d depict an anchor assembly with a baluster assembly 320, mounted on, e.g., a roof, open balcony, terrace, or stairs, etc. which is intended to be interconnected by one or more cables 327 typically made of twisted cable wire. Each anchor assembly and post attachment 320 includes balusters 322 that are configured with a vertically-extending central channel or bore 321 extending over the entire length of the baluster. A threaded rod 324 extends through the central channel 321. In addition, threaded rod 324 and baluster 322 are each configured with horizontal-extending and aligned openings or ports 325, 326, respectively, sufficient to allow the cable 327 to pass through the wood or metal post 322. The cables 327 are used to connect each baluster 322 to other adjacent balusters 322 or to a building wall (not shown). In addition, the bottom end of cylindrical rod or post 316 is threadably received in the blind bore 17' of anchor baseplate 11', for fixation to the wood sheathing, steel, or concrete support structure 21.

Figure 11C:
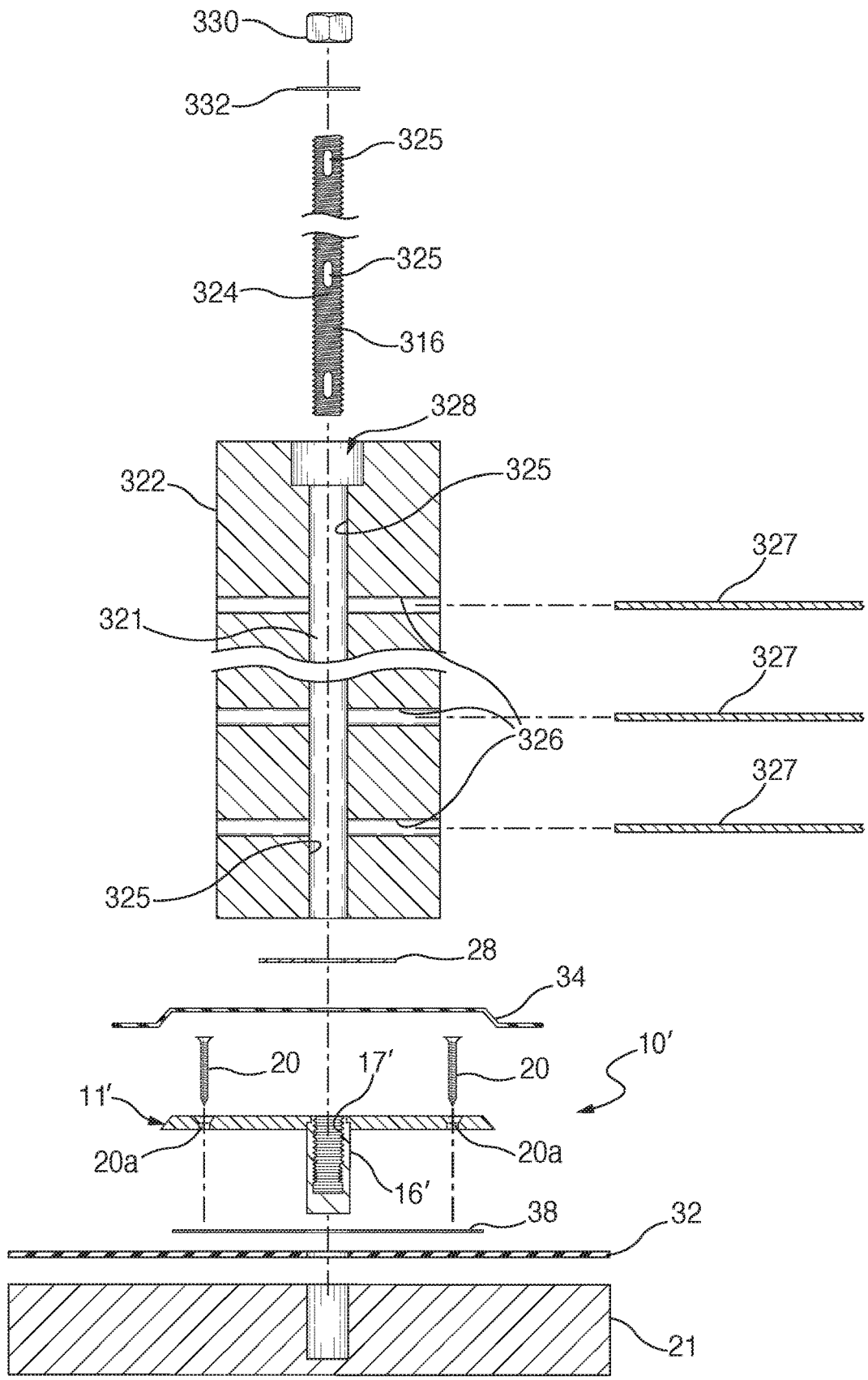
FIG. 11c is an exploded cross-sectional view of the FIG. 11a embodiment.
Figure 11D:
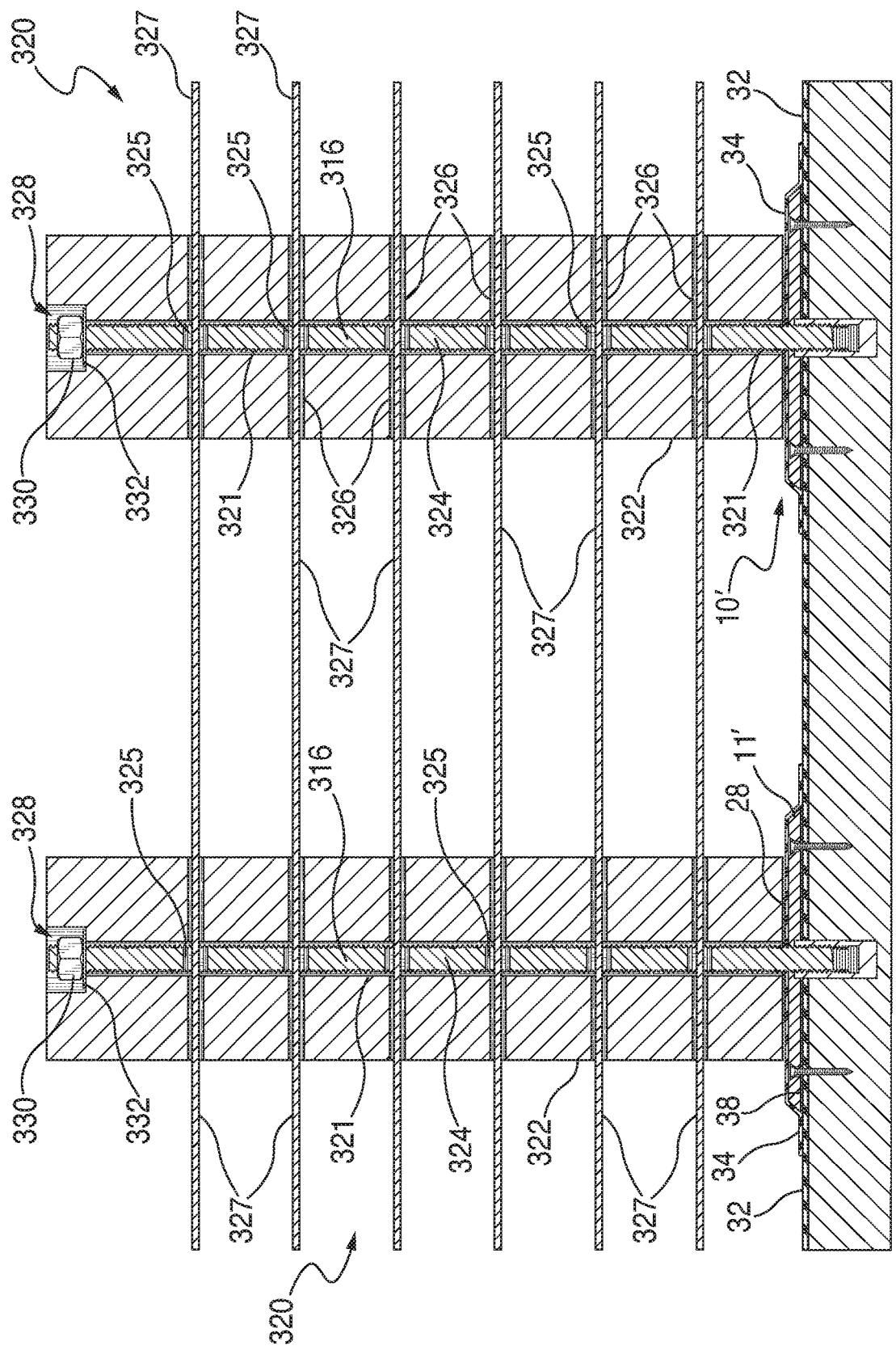
FIG. 11d depicts the employment of two of the FIG. 11a embodiments wherein all of the spaced-apart laterally-extending throughbores are shown threaded with cables extending between and through the spaced-apart balusters.

FIG. 11c presents an exploded view of the anchor and railing assembly and baluster attachment 320, to better highlight its internal structure. As seen in FIG. 11d, the threaded rod 324 extends entirely through the central bore 321 of baluster 322 and through washer 332, optional shim 28, conventional roof membrane 34, anchor baseplate 311, roof membrane 32 and into the bore 17' of post 16' received in and fastened to roof 21. The anchor baseplate 11' is mounted to, e.g., the roof support structure 21 using fasteners 20. More particularly, the bottom end of threaded rod 324 is threadably received in the blind bore 17' of post 16' and rod 324 is locked in place via nut 330 and washers 332, supported in a circular well-shaped recess 328 arranged at the top of the baluster. The threaded rod 321 can be rotated via nut 330 so as to rotatably engage the bottom threaded end of the rod 321 into the threaded blind bore 17' of anchor baseplate 11'. Conversely, if, for any reason, the railing or balusters 322 need to be removed or replaced, the threaded rod 322 and baluster 322 can be threadably removed by reverse rotation from the anchor baseplate 11' in a simple and quick manner. Preferably, the threaded rods 324 are ¾ inch in diameter, where the ports are at least ¼ inch. Also, in a preferred embodiment, the ports 325 are arranged approximately 3 inches apart, center to center, where the oval port is preferably ¾ inch. As should be clear, any number of cables 327 may be included, depending on the safety and/or aesthetic need or desire.

In FIGS. 12a and 12b, the invention provides an anchor post assembly with post attachment 420, wherein threaded rods 321 as shown include a full pass-through bore 335 extending its entire length. The full pass-through bore 335 serves as a conduit, e.g., for electrical wire or cable 337 to pass vertically through the bore 324 of the threaded hollow rod 321. As illustrated, in FIG. 12a the wire 337 can be offset from the axial center of the conduit 324.

In another embodiment, FIGS. 13a, 13b depict an anchor and railing assembly with a baluster 520 that is similar to those depicted in FIGS. 11a-d, but where the baluster post 322 includes a threaded port 329 adjacent its top end. A hollow threaded rod 331 may be threaded into the port 329, to attach it to rod 324, preferably after threaded rod 324 is secured to the post 322 using nut 330 and washer 332. As such, a further structure may be threaded onto second threaded rod 331, such as a top rail (not shown).

FIG. 14a and FIG. 14b depicts a railing assembly similar to FIGS. 13a and 13b with a baluster 620 that includes a threaded rod 324 with an internally-threaded post 329 at its upper end arranged to receive a threaded post 331 which, in turn, now supports a pedestal-like extension 340 of baluster 320 consisting of an upper plate 341, a lower plate 342, and a center hollow column 343 therebetween in which threaded rod 331 is received and which is threadably received in the threaded post 329 in the top end of threaded rod 325. Similarly, the lower end of the baluster is provided with a similar pedestal like extension 350 mounted on the bottom of threaded rod 324 which has upper plate 351, a lower plate 352 and a hollow center column 353 therebetween, and which rests upon a shim 28 and, in turn, anchor baseplate 11'. A pair of plates 352 may also be arranged between the pedestal 350 and the baseplate 11', as shown, for proper spacing or stability. And like the embodiments of FIGS. 11a, 11b, 12, 13 and 14, the balusters (320, 420, 520, 620) and threaded rods 324 also include conduits 326, 325, respectively to pass cables 327 therethrough.

Figure 15A:
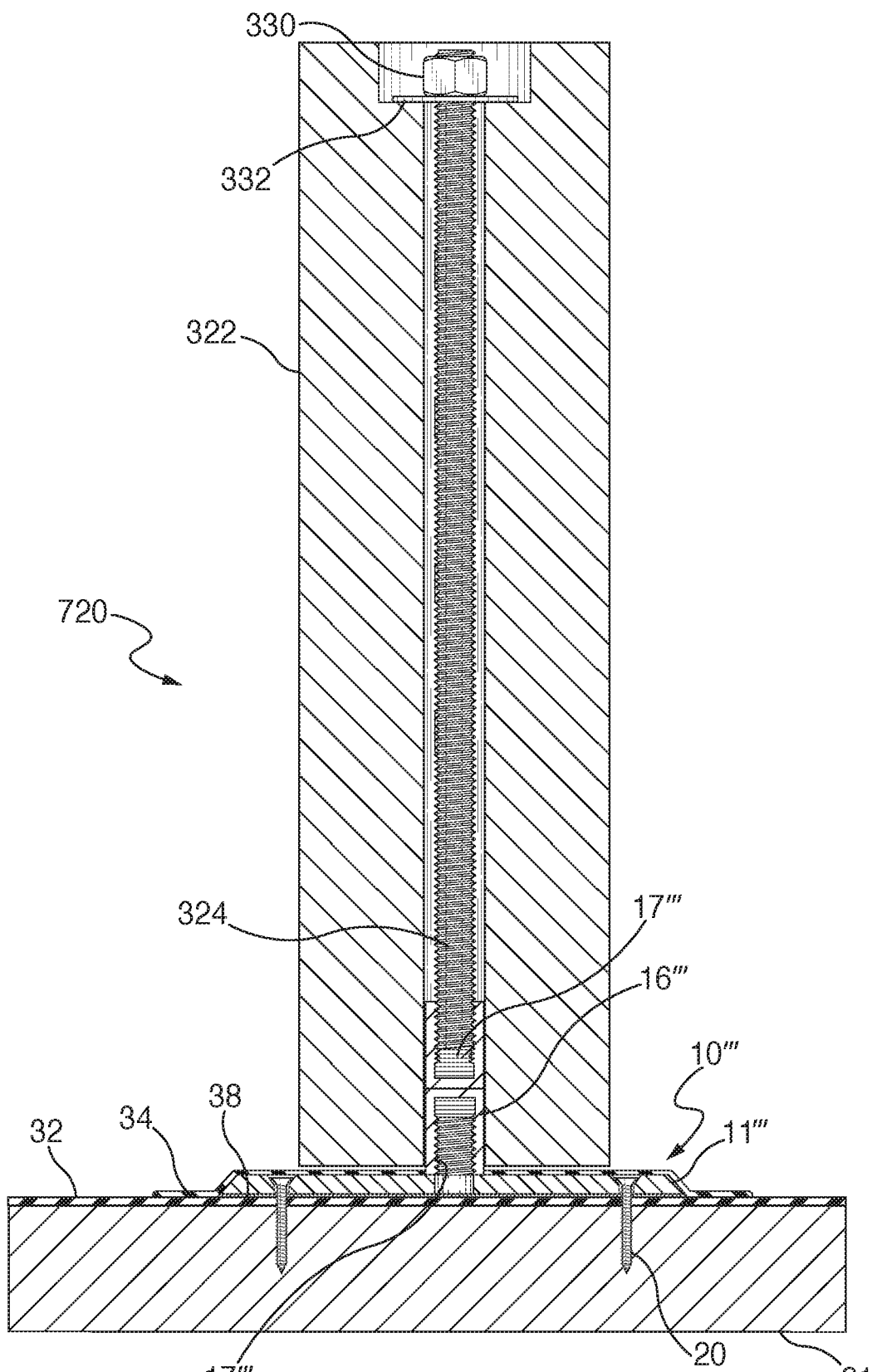
FIG. 15a is a cross-sectional view similar to FIG. 11a, but showing a different arrangement of the cylindrical post attached to the anchor baseplate shown supporting a modified baluster.

FIG. 15a depicts a baluster assembly 720 having an axially arranged threaded rod 324, and a modified arrangement of the anchor baseplate assembly 10''', wherein cylindrical post 16''' has a pair of blind bores 317'''' at opposite ends thereof. In this embodiment, the user has an option to secure the anchor baseplate assembly 10''' from underneath the support 21 via a threaded rod inserted through a base support 21 so it can be threadably inserted into downwardly opening threaded bore 317''' with a nut and washer to secure the anchor baseplate 11''' from below the support structure 21 (not shown). The anchor baseplate 311' also has a second blind bore 17''' end in which the threaded rod 324 can be threadably received and secured to the anchor baseplate 311'.

Figure 15B:
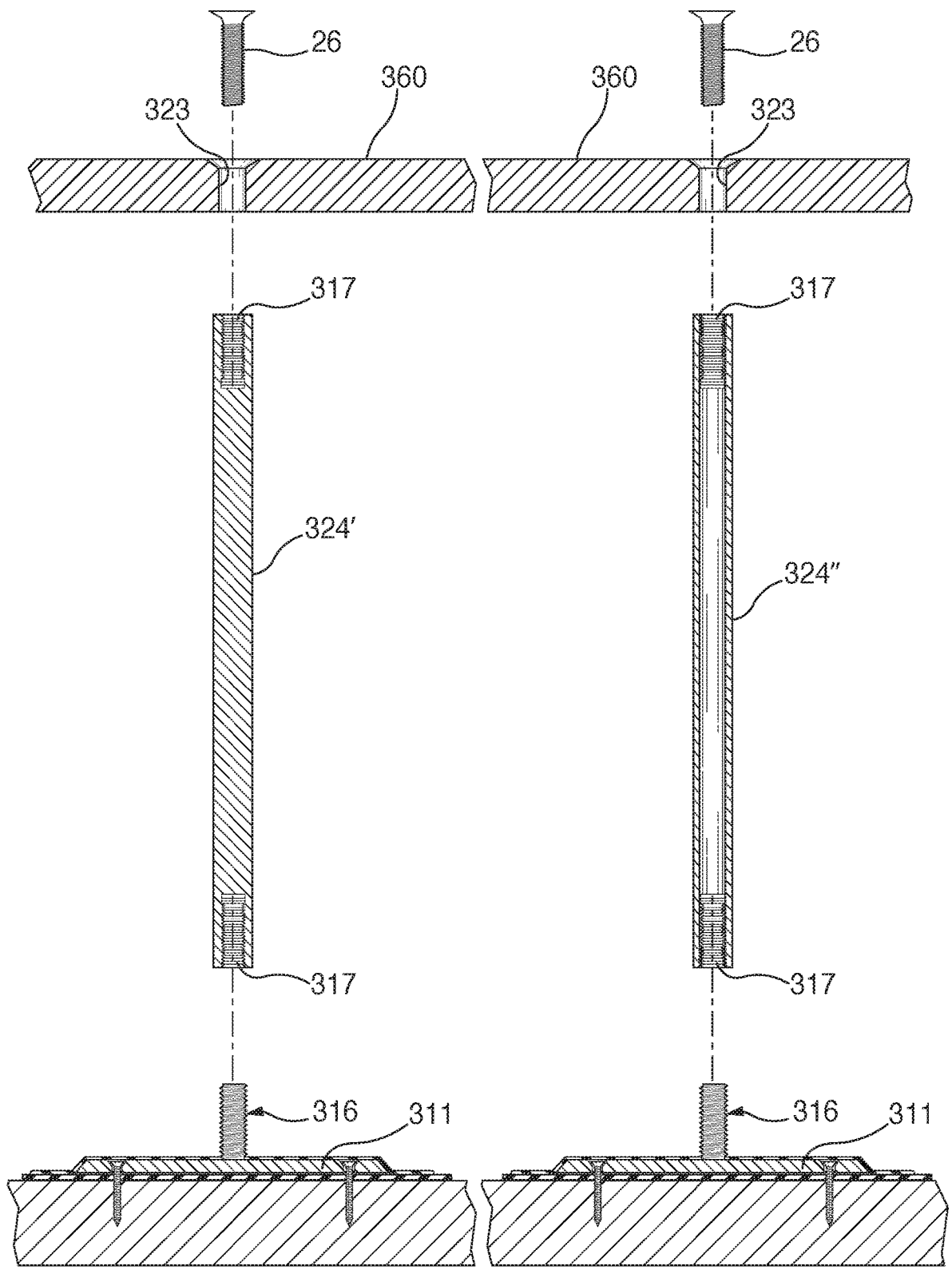
FIG. 15b is a cross-sectional view similar to FIG. 15a, but showing two further arrangements of modified cylindrical posts attached to the anchor baseplate via a threaded stud and a modified baluster having a threaded rod that includes an internal threaded bore at both ends thereof.

FIG. 15b depicts two further modified arrangements that are similar to that of FIG. 15a, but where the balusters 324', 324'' include threaded bores 317 arranged in both ends thereof. The post 324' on the left is a solid smooth cylindrical post and the post on the right is a hollow smooth cylindrical post 324''.

They are shown side-by-side coupled together by a top rail 340 and a pair of threaded bolts 26 which enlarged heads, the threaded shafts of which are inserted in a pair of throughbores 323 in top rail 340 for threaded engagement with the throughbores 317 at the upper end of rods 324' and 324''. The threads bores 317 on the lower end of the rods 324' and 324'' are received in the threaded bores 317 of the threaded posts 316 extending upwardly from anchor baseplates 311.

It is to be understood that the above-mentioned figures are only illustrative of the application of the principles of the present disclosure. Numerous modifications or alternative arrangements may be devised by those skilled in the art without departing from the spirit and scope of the present disclosure. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

For instance, the configuration, dimensions and types of anchor and railing assemblies shown in the various embodiments, and their parts, can be substituted for one another, for particular applications when so needed or desired. For example, the anchor baseplates, screw anchors and balusters can be circular, rectangular, polygonal or have an irregular periphery, such as L-shaped or U-shaped, e.g., posts can be cylindrical, polygonal or of other shapes and can be in the form of a variety of fasteners such as screws or bolts. Similarly, the balusters which are also referred to in the field as spindles, pickets, post, etc. can be of any desired configuration and size as well and can also be in the form of panels, such as glass or plastic or otherwise solid panels.

As briefly touched upon in the discussion of FIG. 4a, it is important to use cylindrical mechanical fasteners having a "straight" thread for mounting an object on a support structure via the internally-threaded cylindrical blind bore or throughbore of the various embodiments described herein. More specifically, mechanical fasteners of this type have a so-called "straight" thread—namely bolts with heads and cylindrical threaded shafts and cylindrical rod-shaped studs which are headless. This is to be distinguished from a "cone-shaped" screw which has a so-called "tapered" thread. The use of such a cylindrical bolt or stud fastener with a straight thread ensures a strong joint and the versatility of accommodating fasteners of varying lengths and widths for achieving various degrees of holding power via threaded receipt in the internally-threaded, cylindrical blind bores of the balusters which also have a straight edge. In contrast, the mechanical fasteners used to affix the anchor baseplate to a support via ancillary holes 15 may generally be of any type including screws with a "tapered" thread.

As can also be appreciated from the foregoing, the shape and the number of anchor baseplates, screw anchors, balusters, rails, cable rails, etc., the shape, type and number of anchor baseplate posts, whether externally-threaded or smooth, the use of non-threaded throughbores, threaded blind bores, and the placement thereof can also be modified depending upon the specific details of the particular application such as the nature, size and material of the roof, building or other support structures, such as metal, wood, or some other composite. Similarly, it is anticipated that the types of fasteners, membranes flashing materials and sealants will also be chosen to be compatible. Also, the elements of the various embodiments may be substituted for one another where appropriate.

In addition, although the anchors aside from the raised hexagon hex screw anchor, preferably employ a flat head screw slot or an Allen key port to secure or remove the anchor to a support structure, other means, such as a star bit etc., could instead be used to assist the user in screwing in and/or removing the anchor to, or from, a building support.

The materials of the components of the anchor and railing assemblies, such as the baseplates, screw anchors and posts can also be made of a variety of materials, including, e.g., metals such as stainless steel, aluminum, bronze, and copper, as well as plastic or composite materials. It is also preferred that the baseplate and its post and the screw anchors and their flanges are integrally formed as a one-piece component. However, it can be appreciated that the posts or screws can be secured to the anchor baseplate or screw flange via welding or other means. Similarly, the rails or balusters can be made from a variety of materials as well, such as wood, various metals including wrought iron or plastic and composite materials.

Accordingly, while particular embodiments of the invention have been described, it is not intended that the invention be limited thereto, as it is intended that the invention be as broad in scope as the prior art will allow and that the specification be read likewise.

What is claimed is:

1. An anchor and railing assembly for anchoring a railing having a planar wall with an opening therethrough to a support structure having a planar wall with an opening thereinto, comprising:
   a plurality of one-piece anchors, each one-piece anchor of said plurality of anchors consisting of an anchor baseplate having a planar top surface and a planar bottom surface with an opening therethrough, and an elongated, cylindrical post having a top end portion permanently secured to said anchor baseplate and a bottom end portion projecting perpendicular to, and below, said planar bottom surface of said anchor baseplate, and an at least partially internally-threaded cylindrical blind bore having an open top end extending from said opening in said top surface of said anchor baseplate to a closed bottom end thereof located in said bottom end portion of said elongated, cylindrical post;
   a plurality of balusters;
   means for fastening each of said baluster of said plurality of balusters to a different one of said one-piece anchors via said threaded blind bore thereof, said means comprising a plurality of threaded mechanical fasteners, each having a straight thread and each fastener of said plurality of threaded mechanical fasteners being attached to a different said baluster of said plurality of balusters and with a straight edge thereof being threadably receivable in a different one of said at least partially internally-threaded blind bore of each one-piece anchor of said plurality of one-piece anchors; and
   means for fastening each said anchor baseplate of each said one-piece anchor to the support structure for permitting said planar bottom surface of each said anchor baseplate and the planar wall of the support structure to lie adjacent and parallel to one another, except for a portion of said planar bottom surface of each said anchor baseplate covered by said post.

2. The assembly according to claim 1, wherein each said baluster of said plurality of balusters has a top end and a bottom end, and said plurality of threaded mechanical fasteners, each comprises a threaded rod for threadably securing said bottom end of each of said balusters to one of said anchor baseplate of one said one-piece anchor of said plurality of one-piece anchors via said threaded blind bore thereof.

3. The assembly according to claim 2, wherein said plurality of balusters are each made from a member selected from the group consisting of wood, metal, plastic, glass and a composite thereof.

4. The assembly according to claim 3, wherein said anchor baseplate is made from metal.

5. The assembly accordingly to claim 2, wherein said balusters each have an axially-aligned central throughbore extending from a top end to a bottom end thereof and wherein one of said threaded rods is receivable in said baluster throughbore.

6. The assembly according to claim 5, wherein said threaded rods each have a top end portion and bottom end portion and said plurality of threaded mechanical fasteners are each attached to a bottom end portion of a different one of said threaded rods.

7. The assembly according to claim 6, wherein each of said plurality of balusters comprises a hollow baluster defining an inner tubular chamber and having a pair of spaced-apart, generally horizontally-extending upper and lower support walls mounted adjacent to said top and bottom ends thereof, respectively, each having a central opening through which said threaded rod may pass.

8. The assembly according to claim 6, wherein each said balusters of said plurality of balusters and each of said threaded rods thereof, each have a plurality of aligned and vertically-spaced-apart, horizontally-extending cable throughbores extending therethrough.

9. The assembly according to claim 8, wherein said assembly additionally includes a plurality of cables, each extending through one of said cable throughbores of each said baluster of said plurality of balusters and said threaded rods thereof.

10. The assembly according to claim 9, wherein each of said cables extend between and through at least two of said balusters of said plurality of balusters disposed adjacent to one another.

11. The assembly according to claim 5, wherein said top end of each of said balusters has a recessed tubular cut-out defining an inner step surrounding said baluster throughbore thereof and wherein said assembly additionally includes means for supporting each of said threaded rods on said inner step of a different one of said balusters.

12. The assembly according to claim 11, wherein said means for supporting comprises a plurality of nuts each threadably receivable on a threaded top end portion of a different one of said threaded rods.

13. The assembly according to claim 5, additionally including means for rotating said threaded rod to enable threaded engagement of said threaded rod with said threaded throughbore of said anchor baseplate.

14. The assembly according to claim 13, wherein said means for rotating is disposed on said top end portion of said rod.

15. The assembly according to claim 14, wherein said means for rotating comprises a member selected from the group consisting of a recessed flat head screw port, an Allen key port and a rotatable-tool receiving port.

16. The assembly according to claim 5, wherein a top end of the threaded rod includes a conventional Allen key port recessed therein.

17. The assembly according to claim 2, additionally comprising a cover for said balusters.

18. The assembly according to claim 17, wherein said cover comprises an elongated top rail extending over said plurality of balusters.

19. The assembly according to claim 17, wherein said cover comprises a post cap.

20. The assembly according to claim 1, further comprising at least one shim plate having a throughbore by which it is disposed between a bottom end of one of said balusters and an anchor baseplate of one of said one-piece anchors.

21. The assembly according to claim 20, wherein at least one of the baseplate, the shim plate and the structure are covered with a rubber membrane.

22. The assembly according to claim 1, wherein said anchor baseplate additionally includes an elongated post having opposite first and second ends with said first end being coupled to said anchor baseplate bottom surface so that said second end thereof projects outwardly from said bottom surface thereof, said post have a threaded blind bore opening onto said first end thereof which merges with an anchor baseplate bore.

23. The assembly according to claim 22, wherein said blind bore of each said post is with one said anchor baseplate, and wherein said means for fastening each said anchor baseplate to the support structure comprises a plurality of spaced-apart, ancillary through holes spaced radially outwardly from said blind bore.

24. The assembly according to claim 23, further comprising a plurality of mechanical fastening members, each receivable through one of said ancillary holes for fastening each said anchor baseplate to the support structure.

25. The assembly according to claim 22, wherein said anchor baseplate post is cylindrical.

26. The assembly according to claim 25, wherein said post has a smooth outer surface.

\* \* \* \* \*